(12) United States Patent
Seto

(10) Patent No.: US 12,524,543 B2
(45) Date of Patent: Jan. 13, 2026

(54) IMAGE FORMING APPARATUS, TERMINAL DEVICE, AND CONTROL METHOD FOR VIRUS QUARANTINE PROCESSING

(71) Applicant: SHARP KABUSHIKI KAISHA, Sakai (JP)

(72) Inventor: Hideki Seto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 209 days.

(21) Appl. No.: 18/202,645

(22) Filed: May 26, 2023

(65) Prior Publication Data

US 2023/0394148 A1 Dec. 7, 2023

(30) Foreign Application Priority Data

Jun. 2, 2022 (JP) ................................ 2022-090325

(51) Int. Cl.
*G06F 21/56* (2013.01)
*G06F 21/60* (2013.01)

(52) U.S. Cl.
CPC .......... *G06F 21/566* (2013.01); *G06F 21/567* (2013.01); *G06F 21/608* (2013.01)

(58) Field of Classification Search
CPC ..... G06F 21/566; G06F 21/567; G06F 21/608
See application file for complete search history.

(56) References Cited

U.S. PATENT DOCUMENTS

| 7,895,658 | B2 * | 2/2011 | Ouchi | G06F 21/84 |
| | | | | 358/1.15 |
| 9,141,794 | B1 * | 9/2015 | Soubramanien | G06F 21/564 |
| 2005/0177748 | A1 * | 8/2005 | Katano | G06F 21/56 |
| | | | | 726/5 |
| 2013/0283278 | A1 * | 10/2013 | Capek | G06F 9/4843 |
| | | | | 718/102 |
| 2015/0128276 | A1 * | 5/2015 | Sanders | H04L 63/145 |
| | | | | 726/24 |
| 2019/0377875 | A1 * | 12/2019 | Hashimoto | H04N 1/00058 |
| 2020/0012529 | A1 * | 1/2020 | Jimbo | H04N 1/00477 |
| 2020/0034555 | A1 * | 1/2020 | Ohno | H04L 63/145 |

FOREIGN PATENT DOCUMENTS

JP 2019-213154 A 12/2019

\* cited by examiner

*Primary Examiner* — Robert B Leung
(74) *Attorney, Agent, or Firm* — ScienBiziP, P.C.

(57) ABSTRACT

An image forming apparatus includes a provider that provides a setting screen on which settings of a system are executed; a setter that executes settings of the image forming apparatus, based on a content set on the setting screen; an image former that forms an image according to the set content; and a processor that executes virus quarantine processing. The provider provides the setting screen including settings pertaining to a virus quarantine timing.

9 Claims, 17 Drawing Sheets

FIG. 3

| JOB START DATE AND TIME | JOB END DATE AND TIME | JOB TYPE |
|---|---|---|
| 2022/04/01 11:12:50 | 2022/04/01 11:13:40 | COPY |
| 2022/04/01 10:43:42 | 2022/04/01 10:43:58 | FAX RECEPTION |
| ⋮ | ⋮ | ⋮ |

FIG. 4

| SETTING ITEM NAME | SETTABLE RANGE | SETTING CONTENT | |
|---|---|---|---|
| USABLE COLOR MODE | COLOR+MONOCHROME/ ONLY MONOCHROME | ONLY MONOCHROME | |
| ⋮ | ⋮ | ⋮ | |
| VIRUS SCANNING FUNCTION | ENABLE/DISABLE | ENABLE | D100 |
| VIRUS SCANNING WHEN APPLICATION IS ADDED | ENABLE/DISABLE | ENABLE | |
| VIRUS SCANNING OF INPUT AND OUTPUT DATA | ENABLE/DISABLE | ENABLE | D102 |
| VIRUS SCANNING AT SPECIFIED TIME | ENABLE/DISABLE | ENABLE | D104 |
| EXECUTION FREQUENCY | MONTHLY/WEEKLY/DAILY | EVERYDAY | D106 |
| EXECUTION TIME | 00:00 TO 23:59 | 23:00 | |
| SETTINGS OF SCANNING AREA | ENABLE/DISABLE | ENABLE | D108 |
| SYSTEM DATA AREA | SCAN/NOT SCAN | NOT SCAN | |
| APPLICATION DATA AREA | SCAN/NOT SCAN | NOT SCAN | |
| INPUT DATA AREA | SCAN/NOT SCAN | SCAN | |
| ON-DEMAND VIRUS SCANNING FUNCTION | ENABLE/DISABLE | ENABLE | D110 |
| ⋮ | ⋮ | ⋮ | |

FIG. 15

| SETTING ITEM | SETTABLE RANGE | SETTING CONTENT |
|---|---|---|
| ⋮ | ⋮ | ⋮ |
| VIRUS SCANNING FUNCTION | ENABLE/DISABLE | ENABLE |
| VIRUS SCANNING WHEN APPLICATION IS ADDED | ENABLE/DISABLE | ENABLE |
| VIRUS SCANNING OF INPUT AND OUTPUT DATA | ENABLE/DISABLE | ENABLE |
| VIRUS SCANNING AT SPECIFIED TIME | ENABLE/DISABLE | ENABLE |
| EXECUTION FREQUENCY | MONTHLY/WEEKLY/DAILY | 1ST DAY OF EVERY MONTH |
| EXECUTION TIME | 00:00 TO 23:59 | 23:00 |
| SETTINGS OF SCANNING RANGE | ENABLE/DISABLE | ENABLE |
| SYSTEM DATA AREA | SCAN/NOT SCAN | NOT SCAN |
| APPLICATION DATA AREA | SCAN/NOT SCAN | NOT SCAN |
| INPUT DATA AREA | SCAN/NOT SCAN | NOT SCAN |
| ON-DEMAND SCANNING FUNCTION | ENABLE/DISABLE | ENABLE |
| NOTIFICATION FUNCTION OF VIRUS SCANNING EXECUTION RESULT | ENABLE/DISABLE | ENABLE |
| NOTIFICATION DESTINATION OF VIRUS SCANNING EXECUTION RESULT | – | admin@example.com |
| NOTIFICATION FUNCTION OF VIRUS SCANNING EXECUTION TIMING | ENABLE/DISABLE | ENABLE |
| NOTIFICATION DESTINATION OF EXECUTION TIMING | – | admin@example.com |
| NOTIFICATION OF EXECUTION TIMING BASED ON DATA UPDATE FREQUENCY | ENABLE/DISABLE | ENABLE |
| NOTIFICATION CONDITION | – | WHEN 100 OR MORE FILES HAVE BEEN UPDATED IN ONE HOUR |
| NOTIFICATION OF EXECUTION TIMING BASED ON USAGE STATUS | ENABLE/DISABLE | ENABLE |
| NOTIFICATION CONDITION | – | WHEN NUMBER OF EXECUTED JOBS PER DAY IS 10 OR MORE |
| NOTIFICATION OF EXECUTION TIMING BASED ON UPDATE STATUS | ENABLE/DISABLE | ENABLE |
| NOTIFICATION CONDITION | – | WHEN UPDATING HAS BEEN EXECUTED 4 TIMES OR MORE IN MONTH |
| ⋮ | ⋮ | ⋮ |

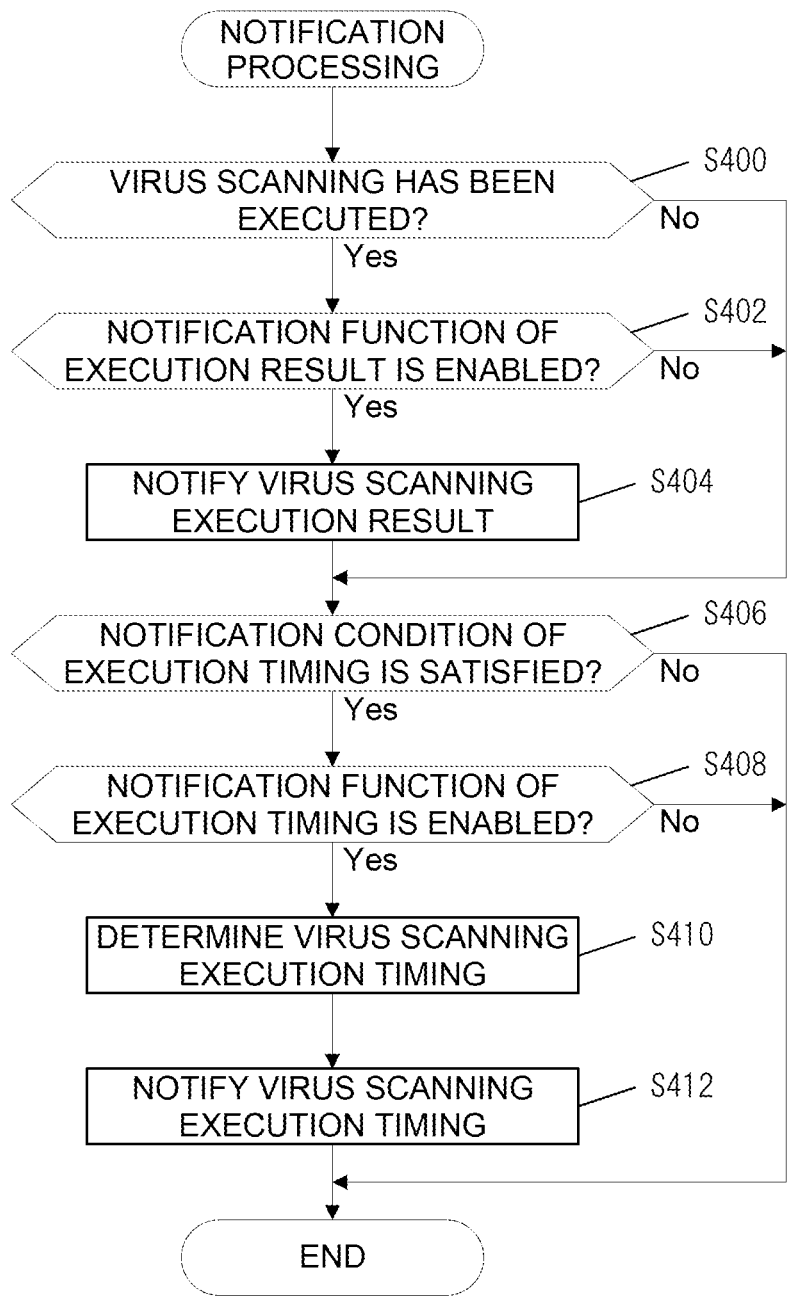

IMAGE FORMING APPARATUS, TERMINAL DEVICE, AND CONTROL METHOD FOR VIRUS QUARANTINE PROCESSING

BACKGROUND OF THE INVENTION

Field of the Invention

The present disclosure relates to an image forming apparatus and the like.

Description of the Background Art

An image forming apparatus such as a multifunction device (multi-function peripheral/printer (MFP)) achieves various functions by transmitting and receiving data to and from another device via a network or the like. In view of a situation as described above, virus quarantine processing such as virus scanning is needed also in a multifunction device.

Generally, a multifunction device is designed in such a way to maximally provide performance of the multifunction device by loaded functions, and when a high-load function is being executed, other functions may be limited. Virus scanning is a function that inspects whether there is a problem in a file system inside a multifunction device, firmware, an operating system (OS), and a part of an application; and is a relatively high-load function. Therefore, it is necessary to execute virus scanning at an appropriate timing. Herein, as a technique for determining a virus scanning execution timing, for example, a technique has been proposed in which virus scanning is executed, when a virus scanning execution request is generated, and virus scanning is executable.

Generally, in a case where basic functions (such as a copy function, a print function, and a scan function) as a multifunction device, and a virus scanning function compete with each other, control of preferentially executing the basic functions as the multifunction device is performed. For example, when input and output to and from a file system inside a multifunction device is executed by using a print function or a scan function by a user operation or the like, virus scanning for the file system may not be executed depending on a state of the multifunction device or the user operation. In other words, generally, it is often difficult to execute a function other than a function being used by the user in a multifunction device main unit, depending on an operating state of the multifunction device or a usage status of the user (such as a case where the user uses the multifunction device frequently). Therefore, there are cases in which it is impossible to execute virus scanning, even when it is necessary to execute virus scanning. In such a case, virus scanning cannot be executed without delay, and virus detection may be delayed. However, in the above-mentioned conventional technique, virus scanning is executed by merely operating an operation panel or the like, and a function of executing virus scanning without delay is not provided.

In view of the above-mentioned problem, an object of the present disclosure is to provide an image forming apparatus and the like capable of providing a setting screen including settings pertaining to a virus quarantine timing.

SUMMARY OF THE INVENTION

In order to solve the above-mentioned problem, an image forming apparatus according to the present disclosure includes: a provider that provides a setting screen on which settings of a system are executed; a setter that executes settings of an image forming apparatus, based on a content set on the setting screen; an image former that forms an image according to the set content; and a processor that executes virus quarantine processing. The provider provides the setting screen including settings pertaining to a virus quarantine timing.

Further, a terminal device according to the present disclosure is a terminal device connectable to the image forming apparatus described above, and includes: a displayer that displays a setting screen provided from the provider; an inputter that inputs settings on the setting screen; and a transmitter that transmits the settings to the image forming apparatus. Further, a control method according to the present disclosure is a control method for an apparatus that forms an image according to settings, and includes: providing a setting screen on which settings of a system are executed; executing settings of an image forming apparatus, based on a content set on the setting screen; and executing virus quarantine processing. When the setting screen is provided, settings pertaining to a virus quarantine timing are included on the setting screen.

According to the present disclosure, it becomes possible to provide an image forming apparatus and the like capable of providing a setting screen including settings pertaining to a virus quarantine timing.

BRIEF DESCRIPTION OF THE DRAWINGS

FIG. 3 is a diagram illustrating a data structure of job history information according to the first embodiment.

FIG. 4 is a diagram illustrating a data structure of a setting table according to the first embodiment.

FIG. 15 is a diagram illustrating a data structure of a setting table according to a fourth embodiment.

FIG. 16 is a flowchart illustrating a flow of notification processing according to the fourth embodiment.

DESCRIPTION OF THE PREFERRED EMBODIMENTS

Hereinafter, embodiments for implementing the present disclosure are described with reference to the drawings. Note that, the following embodiments are an example for describing the present disclosure, and the technical scope of the disclosure described in the claims is not limited to the following description.

1. First Embodiment

1.1 Overall Configuration

Figure 1:
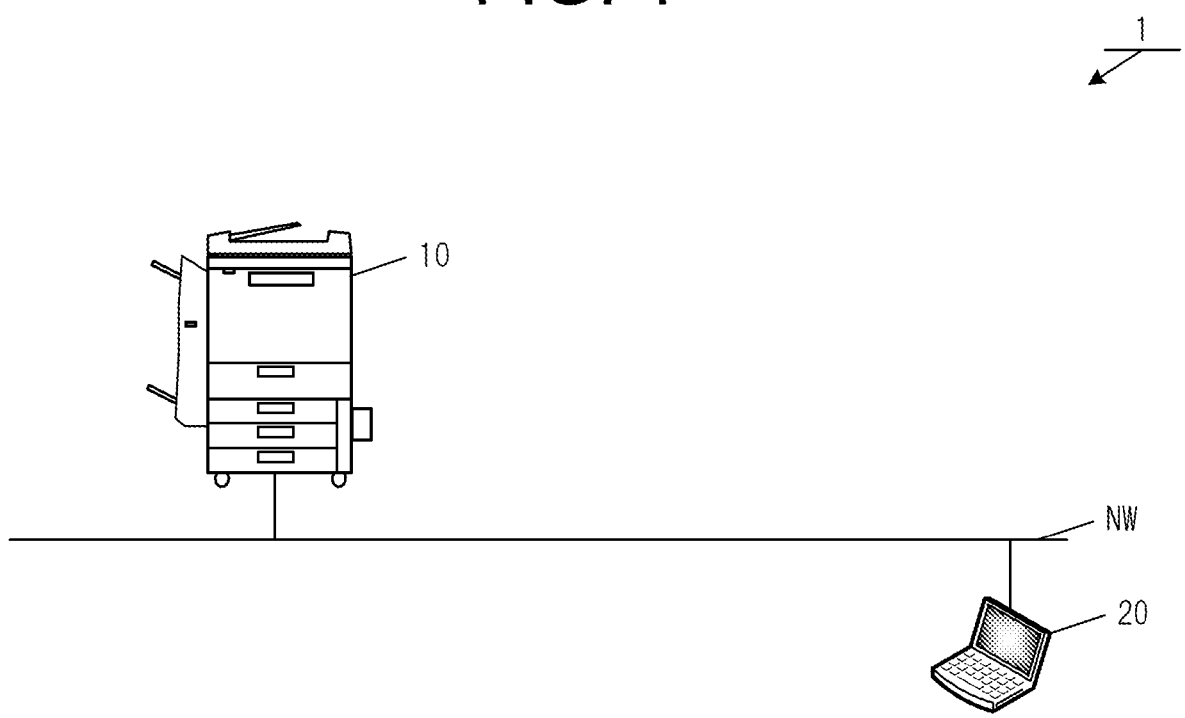
FIG. 1 is a diagram illustrating an overall configuration of a system according to a first embodiment.

FIG. 1 is a diagram illustrating an overall configuration of a system 1 according to the present disclosure. As illustrated in FIG. 1, the system 1 is configured in such a way that a multifunction device 10 and a terminal device 20 are connected via a network NW. The network NW is, for example, a local area network (LAN), but any network may be used as long as the multifunction device 10 and the terminal device 20 can communicate with each other by short-range wireless communication or the like.

The multifunction device 10 is a device to which an image forming apparatus according to the present disclosure is applied. The multifunction device 10 is an image processing apparatus including a copy function, a scan function, a print function, a fax function, and other functions, and is also called a multi-function printer/peripheral (MFP). The terminal device 20 is a device used by a user, and is an information processing device configured of, for example, a mobile terminal such as a smartphone or a tablet terminal, a personal computer (PC), or the like.

1.2 Functional Configuration

1.2.1 Multifunction Device

Figure 2:
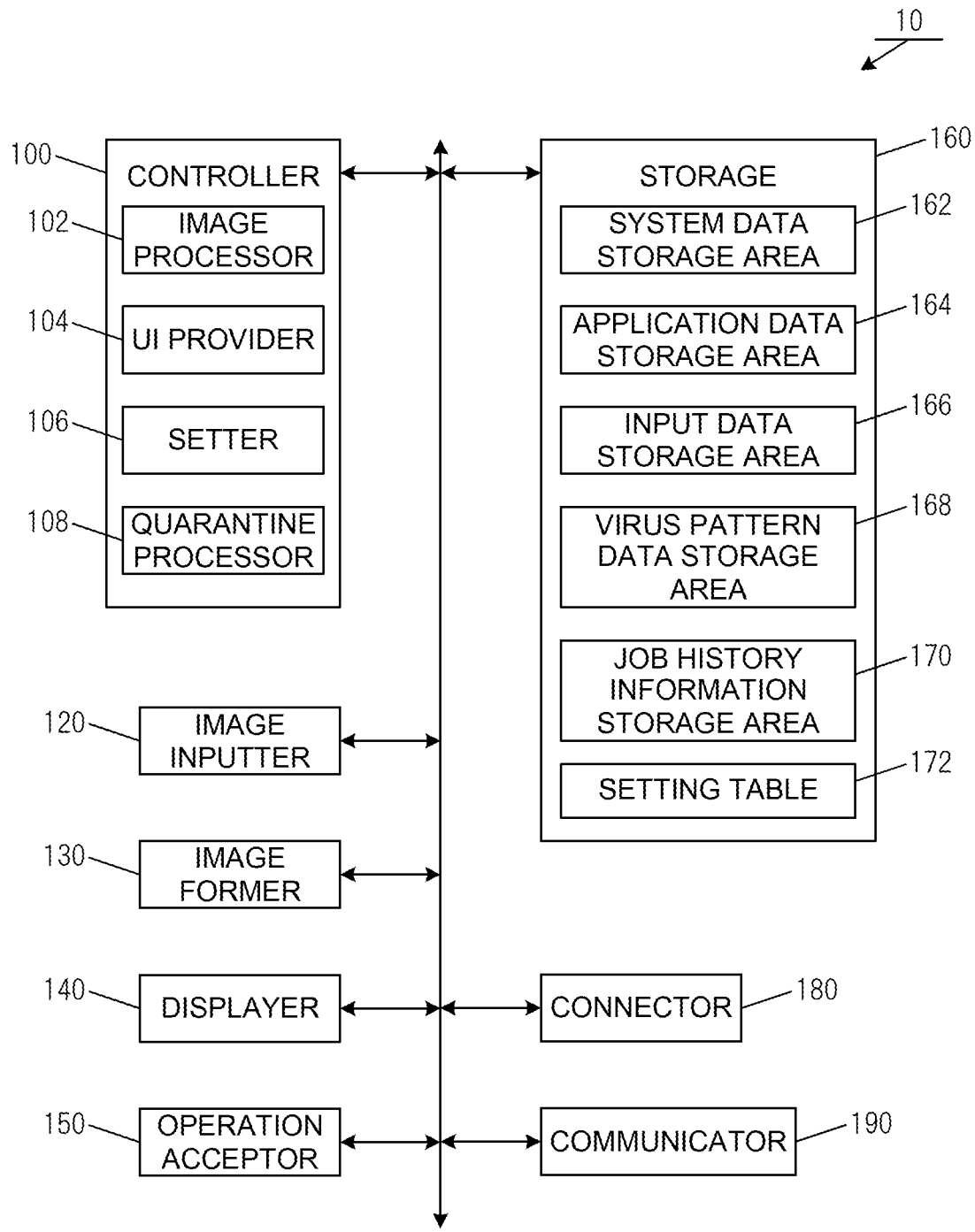
FIG. 2 is a block diagram illustrating a functional configuration of a multifunction device according to the first embodiment.

A functional configuration of the multifunction device 10 is described with reference to FIG. 2. The multifunction device 10 is configured of a controller 100, an image inputter 120, an image former 130, a displayer 140, an operation acceptor 150, a storage 160, a connector 180, and a communicator 190.

The controller 100 is a functional unit for controlling the entirety of the multifunction device 10. The controller 100 achieves various functions by reading and executing various programs stored in the storage 160. For example, the controller 100 is configured of one or more arithmetic devices (central processing units (CPUs)) and the like. The controller 100 may also be configured of a system on a chip (SoC) having a plurality of functions among the functions described below.

The controller 100 functions as an image processor 102, a user interface (UI) provider 104, a setter 106, and a quarantine processor 108 by executing the programs stored in the storage 160.

The image processor 102 executes various pieces of processing related to an image. For example, the image processor 102 executes sharpening processing or gradation conversion processing with respect to an image input via the image inputter 120, the connector 180, and the communicator 190.

The UI provider 104 provides a setting screen on which various settings (system settings) of the multifunction device 10 are executed. The setting screen to be provided by the UI provider 104 is a screen that enables to display and change a setting content stored in a setting table 172 to be described later.

For example, the UI provider 104 provides (displays) a setting screen (main unit operation UI) on the displayer 140, which functions as an operation terminal of the multifunction device 10. The UI provider 104 may also provide a setting screen (Web operation UI) to be displayed via a Web browser. The Web operation UI is displayed within a Web browser to be displayed on the multifunction device 10 or the terminal device 20. Providing the Web operation UI to another device such as a PC by the UI provider 104 allows the user to execute settings of the multifunction device 10 from another device. In this case, the UI provider 104 functions as a Web server (device Web), and accessing to a uniform resource locator (URL) that provides a setting screen provides the web operation UI to a device that has accessed to the URL.

In addition, the UI provider 104 acquires a setting content input via the setting screen, and outputs the setting content to the setter 106.

In the present embodiment, the setting table 172 includes a setting content of settings (e.g., settings pertaining to execution of virus scanning) related to virus quarantine processing in the multifunction device 10. The virus quarantine processing in the multifunction device 10 includes virus scanning of detecting a virus from data stored in the storage 160 of the multifunction device 10, processing of removing the detected virus, and processing of quarantining or deleting data in which the virus is detected.

Furthermore, settings related to virus quarantine processing in the multifunction device 10 include a date and time (quarantine timing) when virus quarantine processing is executed. Therefore, the setting screen includes a setting means for executing settings pertaining to virus quarantine processing, and a setting means for setting a quarantine timing. The date and time when virus quarantine processing is executed is, for example, a date and time when virus scanning is executed.

Note that, the following description is made based on a premise that virus quarantine processing is virus scanning.

The setter 106 executes settings of the multifunction device 10, based on a content set on a setting screen by reflecting a setting content acquired by the UI provider 104 to the multifunction device 10. For example, the setter 106 stores, in the setting table 172 to be described later, a setting content acquired by the UI provider 104.

The quarantine processor 108 executes virus quarantine processing, based on settings related to virus quarantine stored in the setting table 172. In other words, the quarantine processor 108 achieves a virus scanning function (application) installed (incorporated) in the multifunction device 10. For example, in a case where a pattern indicated by virus pattern data stored in a virus pattern data storage area 168 to be described later, and some pieces of data stored in the storage 160 coincide with each other, the quarantine processor 108 detects a virus assuming that the data are infected with the virus.

The image inputter 120 inputs an image to the multifunction device 10. The image inputter 120 is, for example, configured of a scanner device or the like that reads a document placed on a document table. The scanner device is, for example, a device that converts an image into an electrical signal by an image sensor such as a charge coupled device (CCD) or a contact image sensor (CIS), and quantizes and encodes the electrical signal. Note that, the image inputter 120 is configured of an interface (terminal) for reading an image stored in a universal serial bus (USB) memory, and may input the image by reading the image from the USB memory. The image inputter 120 may also input an image by receiving the image from another device via the connector 180 and the communicator 190.

The image former 130 forms (prints) an image on a recording medium such as recording paper according to a setting content stored in the setting table 172 by being set via a setting screen. For example, the image former 130 forms a color image or only a monochromatic image according to settings of an available color mode. The image former 130 is, for example, configured of a printing device such as a laser printer utilizing an electrophotographic method. The image former 130, for example, feeds recording paper from a paper feed tray provided in the multifunction device 10, forms an image on a surface of the recording paper, and discharges the recording paper from a paper discharge tray provided in the multifunction device 10.

The displayer 140 displays various pieces of information. The displayer 140 is configured of, for example, a display device such as a liquid crystal display (LCD), an organic electro-luminescence (EL) display, and a micro light emitting diode (LED) display.

The operation acceptor 150 accepts an operation instruction by the user using the multifunction device 10. The operation acceptor 150 is configured of an input device such as key switches (hardware keys) and a touch sensor. A method of detecting an input by contact (touch) by a touch sensor may be a general detection method such as, for example, a resistive film method, an infrared method, an electromagnetic induction method, or a capacitance method. Note that, a touch panel in which the displayer 140 and the operation acceptor 150 are integrally formed may be mounted on the multifunction device 10. Further, an operation terminal of a main unit of the multifunction device 10 is configured of the displayer 140 and the operation acceptor 150, and an operation screen of the multifunction device 10 is displayed on the displayer 140.

The storage 160 stores various programs necessary for an operation of the multifunction device 10, and various pieces of data. The storage 160 is, for example, configured of a storage device such as a solid state drive (SSD) being a semiconductor memory, or a hard disk drive (HDD).

The storage 160 secures a system data storage area 162, an application data storage area 164, an input data storage area 166, the virus pattern data storage area 168, and a job history information storage area 170, and also stores the setting table 172.

The system data storage area 162 stores system data. The system data are data for achieving basic functions of the multifunction device 10, and are data for an operating system (OS), and programs and data for executing the basic functions. The basic functions are functions incorporated in advance in the multifunction device 10, and are, for example, a copy function, a scan function, a print function, a fax function, and the like.

The application data storage area 164 stores data applications (programs), and data necessary for executing the applications. The application is, for example, a program capable of adding a new function to the multifunction device 10, or extending a function included in the multifunction device 10, and is incorporated in the multifunction device 10 by the user.

The input data storage area 166 stores data input to the multifunction device 10. The data to be input to the multifunction device 10 are, for example, data of a facsimile image transmitted to the multifunction device 10, or data of a document or an image acquired from another information processing device or a storage device (e.g., a USB memory).

Note that, the system data storage area 162, the application data storage area 164, and the input data storage area 166 may be further divided into a plurality of partial areas. For example, the input data storage area 166 may be divided into n areas, such as an area 1, an area 2, an area 3, . . . , and an area n.

The virus pattern data storage area 168 stores virus pattern data. The virus pattern data are data (virus definition) in which an appearance pattern of data specific or unique to a known computer virus is defined, and are stored or updated by acquiring from a device or a service that provides the virus pattern data. Note that, the multifunction device 10 may include a function of setting an update scheduling for virus pattern data.

The job history information storage area 170 stores information (job history information) related to a history of a job executed by the multifunction device 10. The job history information includes, for example, as illustrated in FIG. 3, a job start date and time (e.g., "2022/04/01 11:12:50"), a job end date and time (e.g., "2022/04/01 11:13:40"), and a type (e.g., "copy") of an executed job. The job history information is stored when execution of a job is completed.

The setting table 172 is a table that stores a setting content of the multifunction device 10. As illustrated in FIG. 4, for example, the setting table 172 is a table in which a setting item name, a settable range indicating a range and a type settable as a setting content for the setting item, and a setting content set for the setting item are associated with one another. The setting table 172, for example, stores in advance an initial value, and is updated by the setter 106.

The setting table 172 includes a content of settings related to virus quarantine, in addition to a content of settings related to user authentication and user management of the multifunction device 10, a content of settings related to an image to be formed by the multifunction device 10, and the like. The following contents are stored as setting contents of various settings related to virus quarantine.

(1) Settings for Enabling/Disabling Virus Scanning Function (D100 in FIG. 4)

The settings for enabling/disabling the virus scanning function are settings for switching between enabling and disabling the virus scanning function in the entirety of the multifunction device 10.

(2) Settings for Enabling/Disabling Virus Scanning of Input and Output Data (D102 in FIG. 4)

The settings for enabling/disabling virus scanning of input and output data are settings for switching whether input data or file is to be scanned at a stage when data (e.g., scan data, print data, fax data (facsimile data), or the like) to be input to the multifunction device 10 are input from the outside.

(3) Settings of Virus Scanning at Specified Time (D104 in FIG. 4)

The settings of virus scanning at a specified time are scheduling settings related to virus scanning execution, and are settings for specifying a day of the week and a time when virus scanning is executed, and allowing virus scanning to be automatically executed at the specified date and time. The settings achieve a scheduling function of virus scanning. As illustrated in D106 in FIG. 4, a setting content of settings of virus scanning at a specified time may include a frequency (e.g., monthly, weekly, or daily) with which virus scanning is executed, and a time when virus scanning is executed. When the frequency is "monthly", a day (e.g., "the 15th day of every month") or a specific day of the week (e.g., "the first Sunday of every month") when virus scanning is executed may be settable. Further, when the frequency is "weekly", a day of the week (e.g., "Sunday") when virus scanning is executed may be settable.

(4) Settings of Scanning Area (Execution Range for Virus Scanning) (D108 in FIG. 4)

The settings of a scanning area are settings for specifying an area for virus scanning, in a case where virus scanning is automatically executed at a specified time. For example, as illustrated in D108 in FIG. 4, it is possible to set whether to scan the system data storage area 162, whether to scan the application data storage area 164, and whether to scan the input data storage area 166, individually.

Note that, the target for virus scanning may be a specific file or a specific folder to be stored in a specific area, such as the input data storage area 166. In this case, a file or a folder for virus scanning may be specifiable by the user.

(5) Settings for Enabling/Disabling On-Demand Virus Scanning Function (D110 in FIG. 4)

The settings for enabling/disabling the on-demand virus scanning function are settings for switching whether to enable the on-demand virus scanning function, which is a function of immediately executing (manually executing) virus scanning by an operation of the user such as an administrator of the multifunction device 10.

Note that, a content other than the setting contents described above may be stored in the setting table 172. For example, settings as to whether to execute virus scanning when the multifunction device 10 is activated may be stored, or basic settings of the multifunction device 10 and settings related to security may be stored. In addition to the setting table 172, information on parameters of the multifunction device 10 may be stored in the storage 160. The parameter information of the multifunction device 10 is information to be updated by the system of the multifunction device 10, and is, for example, a date and time of previous virus scanning, a result of virus detection, a date and time when virus pattern data have been updated most recently, the version number of virus pattern data, and the like.

The connector 180 connects the multifunction device 10 to another device. The connector 180 is configured of, for example, a universal serial bus (USB) interface, and is connected to a storage device or the like such as a USB memory. Note that, the connector 180 may be connectable to another device by using a short-range wireless communication means by being configured of a device (e.g., an antenna or the like) for executing short-range wireless communication such as near field communication (NFC) or Bluetooth (registered trademark).

The communicator 190 communicates with another device or equipment such as the terminal device 20 via a network such as a LAN or a wide area network (WAN). The communicator 190 is configured of, for example, a communication device or a communication module such as a network interface card (NIC) for use in a wired/wireless LAN. Note that, the communicator 190 may include an interface (network I/F) connectable to a network.

The communicator 190 may be connected to a communication network such as a public network, a LAN, or the Internet, and may be capable of transmitting data to the outside by a communication method such as facsimile or an e-mail via the communication network.

1.2.2 Terminal Device

Figure 5:
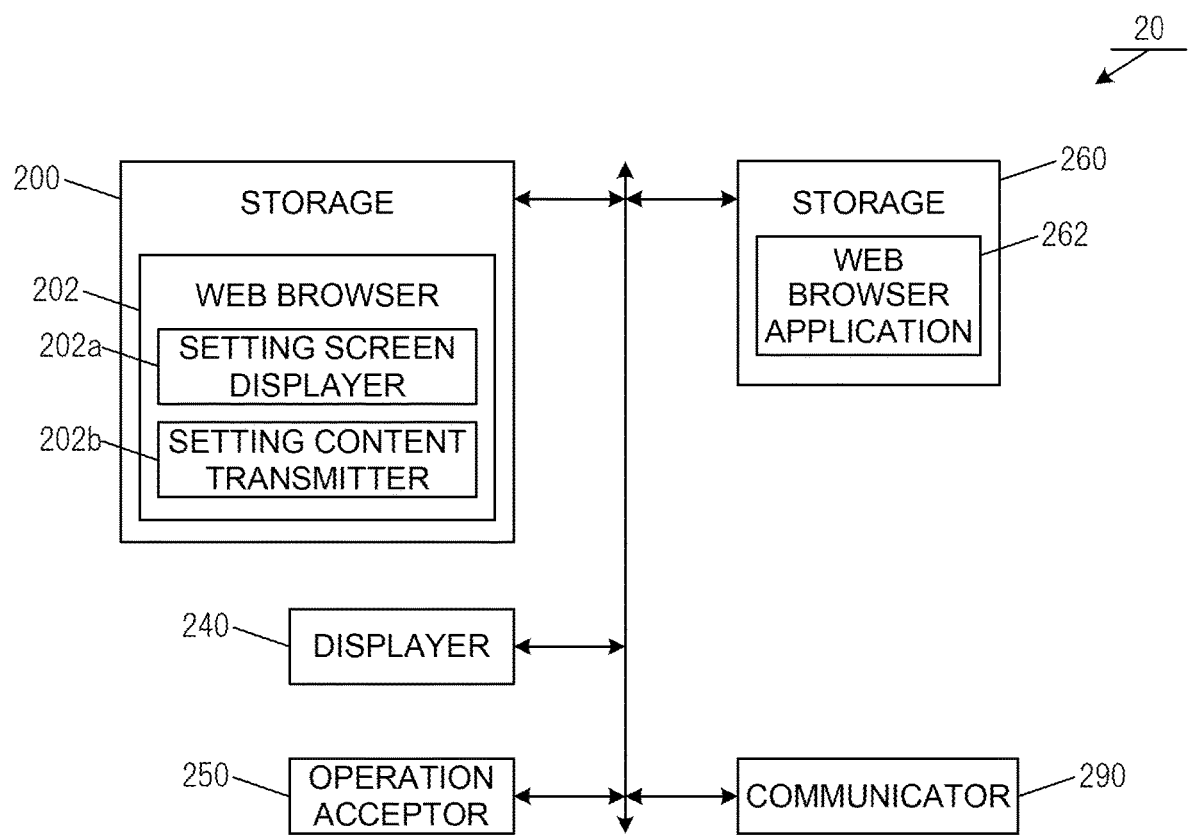
FIG. 5 is a block diagram illustrating a functional configuration of a terminal device according to the first embodiment.

A functional configuration of the terminal device 20 according to the present embodiment is described with reference to FIG. 5. As illustrated in FIG. 5, the terminal device 20 is configured of a controller 200, a displayer 240, an operation acceptor 250, a storage 260, and a communicator 290.

The controller 200 is a functional unit for controlling the entirety of the terminal device 20. The controller 200 achieves various functions by reading and executing various programs stored in the storage 260, and is configured of one or more arithmetic devices (e.g., a CPU).

The controller 200 functions as a Web browser 202 by reading and executing a Web browser application 262 stored in the storage 260. The Web browser 202 controls the displayer 240 to display a Web page. In the present embodiment, the Web browser 202 also achieves a setting screen displayer 202a that displays, on the displayer 240, a setting screen to be provided from the multifunction device 10, and a setting content transmitter 202b that transmits, to the multifunction device 10, a setting content input via the setting screen. The setting screen displayer 202a and the setting content transmitter 202b are achieved, for example, by a hyper text markup language (HTML) rendering engine.

The displayer 240 displays various pieces of information. The displayer 240 is configured of a display device such as, for example, an LCD, an organic EL panel, or a micro LED display.

The operation acceptor 250 is a functional unit for accepting an operation of the user using the terminal device 20, and is configured of an input device such as a touch sensor. A method of detecting an input by a touch sensor may be a general detection method, such as, for example, a resistive film method, an infrared method, an electromagnetic induction method, or a capacitance method. Note that, the terminal device 20 may include a touch panel in which the displayer 240 and the operation acceptor 250 are integrally formed. Further, the operation acceptor 250 may be configured of various operation devices such as a mouse and a keyboard, as long as the user can input information.

The storage 260 stores various programs necessary for an operation of the terminal device 20, and various pieces of data. The storage 260 is configured of a storage device such as, for example, an SSD being a semiconductor memory, or an HDD.

The storage 260 stores the Web browser application 262. The Web browser application 262 is an application that causes the displayer 240 to display a screen of the Web browser 202 by being read and executed by the controller 200.

The communicator 290 communicates with another device or equipment such as the multifunction device 10 via a network such as a LAN or a WAN. The communicator 290 is configured of, for example, a communication device or a communication module such as a NIC for use in a wired/wireless LAN. Note that, the communicator 290 may include an interface connectable to a network.

1.3 Overview of Processing of Providing Setting Screen

An overview of setting screen providing processing is described with reference to FIG. 6. Herein, description is made for a case in which a setting screen is provided from the multifunction device 10 to the terminal device 20, as a Web operation UI. First, the UI provider 104 of the multifunction device 10 reads the setting table 172, and generates display information on a setting screen (P1 in FIG. 6). The setting screen display information is information for use in displaying a setting screen, and, for example, is HTML data for use in displaying a setting screen in a Web browser, an image and script data to be referred to from the HTML data.

Figure 6:
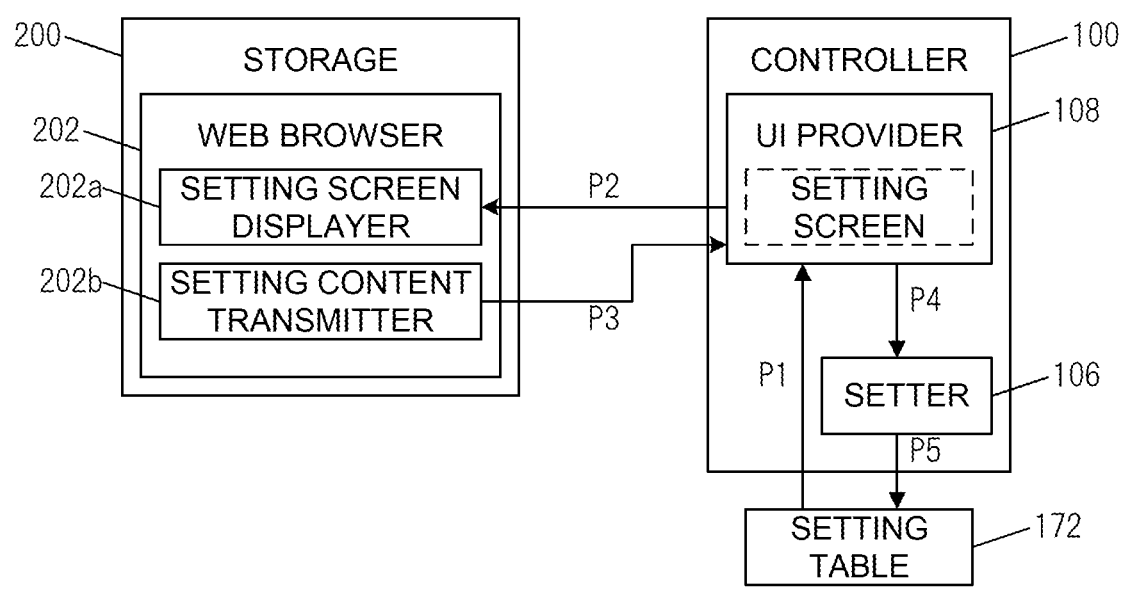
FIG. 6 is a diagram illustrating an overview of setting screen providing processing according to the first embodiment.

The UI provider 104 transmits the setting screen display information to the terminal device 20 via the communicator 190 (P2 in FIG. 6). The setting screen displayer 202a of the terminal device 20 displays, on the displayer 240, a setting screen, based on the setting screen display information received from the multifunction device 10. Thus, a Web operation UI is displayed on the displayer 240.

Subsequently, the setting content transmitter 202b of the terminal device 20 transmits a setting content input via the Web operation UI to the multifunction device 10 (P3 in FIG. 6). This allows the UI provider 104 of the multifunction device 10 to acquire a setting content from the terminal device 20, and to output the setting content to the setter 106 (P4 in FIG. 6).

The setter 106 of the multifunction device 10 stores, in the setting table 172, the content acquired from the terminal device 20 (P5 in FIG. 6). This allows the setting content input via the Web operation UI displayed on the terminal device 20 to be stored in the setting table 172, and the setting content is reflected to the multifunction device 10.

1.4 Flow of Processing

1.4.1 Main Processing of Multifunction Device

Main processing to be executed by the multifunction device 10 is described with reference to FIG. 7. The main processing is executed, for example, by causing the controller 100 to read a program stored in the storage 160 at a timing when power of the multifunction device 10 is turned on.

First, the controller 100 executes activation processing (step S100). The activation processing is processing of making the multifunction device 10 available for use, and, for example, is processing of supplying power to each functional unit of the multifunction device 10, and warming up the image former 130.

Subsequently, the controller 100 displays a home screen on the displayer 140 (step S102). The home screen includes an instruction means (e.g., a function button) for instructing use of the basic functions provided by the multifunction device 10, such as a copy function and a scan function. By selecting a function button, the user can cause the multifunction device 10 to execute processing (job) of using the function selected by the user. In addition, the home screen may include an instruction means (e.g., a setting button) for changing settings of the multifunction device 10, or may include an area where a message or an icon indicating a state of the multifunction device 10 is displayed.

Subsequently, in a case where a function button is selected, the controller 100 displays a job execution screen on the displayer 140 (step S104; Yes→step S106). The job execution screen is a screen for setting a job, and instructing execution of the job. When an operation of executing a job is performed by the user, the controller 100 executes the job (step S108). At this occasion, the controller 100 stores, in the job history information storage area 170, information on the executed job, as job history information. The controller 100 may also display the home screen on the displayer 140, after job execution has been completed. Note that, when the controller 100 determines that the function button has not been selected in step S104, the pieces of processing of steps S106 and S108 are omitted (step S104; No).

Subsequently, the controller 100 determines whether the setting button has been selected (step S110). In a case where the setting button has been selected, the controller 100 (UI provider 104) displays the setting screen on the displayer 140 (step S110; Yes→step S112).

Subsequently, in a case where an operation of reflecting (storing) the setting content to the multifunction device 10 is performed by the user, the controller 100 (setter 106) stores the setting content displayed on the setting screen in the setting table 172 (step S114). For example, the setter 106 stores, in the setting table 172, a setting content acquired by the UI provider 104 due to an operation of reflecting the setting content to the multifunction device 10. Note that, in a case where the controller 100 determines that the setting button has not been selected in step S110, the pieces of processing of steps S112 and S114 are omitted (step S110; No).

Subsequently, the controller 100 determines whether the time has reached a date and time of virus scanning execution (step S116). For example, the controller 100 determines that the time has reached a date and time of virus scanning execution, in a case where a function of executing virus scanning at a specified time is enabled based on the setting content stored in the setting table 172, and the date and time to be specified by the execution frequency and the execution time coincides with the current date and time.

In a case where the time has reached the date and time of virus scanning execution, the controller 100 (quarantine processor 108) executes virus scanning, based on the setting content stored in the setting table 172 (step S116; Yes→step S118). For example, in a case where a scanning area is specified, the quarantine processor 108 executes virus scanning for the area that is specified for scanning. Note that, in a case where the controller 100 determines that the time has not reached the date and time when virus scanning is to be executed in step S116, the processing of step S118 is omitted (step S116; No).

Subsequently, the controller 100 determines whether a finishing operation has been performed (step S120). The finishing operation is an operation for finishing an operation of the multifunction device 10, and, for example, is an operation of pressing a button to turn off the power of the multifunction device 10, or an operation for shutting down the multifunction device 10 that is input via a screen to be displayed on the displayer 140.

Figure 7:
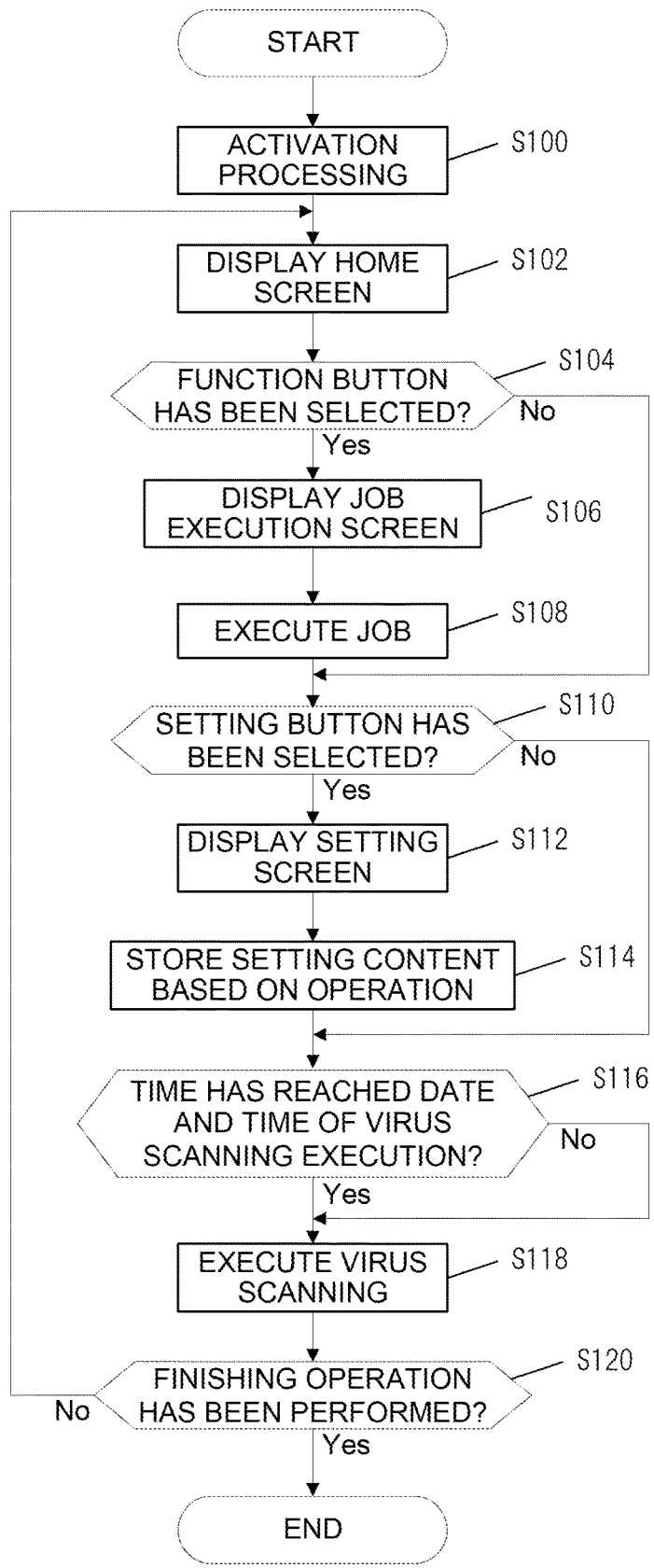
FIG. 7 is a flowchart illustrating a flow of main processing according to the first embodiment.

In a case where a finishing operation has been performed, the controller 100 terminates the processing illustrated in FIG. 7 (step S120; Yes). On the other hand, in a case where a finishing operation has not been performed, the controller 100 returns to step S102 (step S120; No).

1.4.2 Setting Screen Providing Processing

Setting screen providing processing to be executed by the multifunction device 10 is described with reference to FIG. 8. The setting screen providing processing is processing of providing a setting screen to another device connected to the multifunction device 10. The setting screen providing processing is repeatedly executed in parallel with the main processing illustrated in FIG. 7 by causing the controller 100 to read a program stored in the storage 160.

First, the controller 100 determines whether a setting screen request has been received from another device such as the terminal device 20 via the communicator 190 (step S130). The setting screen request is information indicating a request for information on a setting screen. The setting screen request may be a hypertext transfer protocol (HTTP) request, which is a request for displaying a Web operation UI. Note that, the following description is made based on a premise that another device that transmits a setting screen request is the terminal device 20.

In a case where the controller 100 (UI provider 104) has received a setting screen request from the terminal device 20, the controller 100 transmits setting screen display information to the terminal device 20 (step S130; Yes→step S132). Note that, in a case where the controller 100 determines in step S130 that a setting screen request has not been received, the processing of step S132 is omitted (step S130; No).

Subsequently, the controller 100 (UI provider 104) determines whether a setting update request has been received from the terminal device 20 via the communicator 190 (step S134). The setting update request is information indicating a request for updating settings of the multifunction device 10. The setting update request includes, for example, information indicating a setting item to be updated, and an updated setting content in the setting item.

In a case where the controller 100 (setter 106) has received a setting update request, the controller 100 updates the setting table 172, based on information included in the setting update request (step S134; Yes→step S136). For example, the setter 106 stores, in the setting table 172, a setting content received by the UI provider 104 in step S134. Note that, in a case where the controller 100 determines that a setting update request has not been received in step S134, the processing of step S136 is omitted (step S134; No).

Subsequently, the controller 100 determines whether a virus scanning execution request has been received from the terminal device 20 via the communicator 190 (step S138). The virus scanning execution request is information indicating requesting the multifunction device 10 to immediately execute virus scanning.

In a case where the controller 100 (quarantine processor 108) has received a virus scanning execution request, the controller 100 executes virus scanning (step S138; Yes→step S140). The processing of step S138 is the same processing as step S118 in FIG. 7. Note that, in a case where the controller 100 determines that a virus scanning execution request has not been received in step S138, the processing of step S140 is omitted (step S138; No).

Note that, in a case where a Web operation UI is displayed on the terminal device 20, a setting update request or a virus scanning execution request may be transmitted from the terminal device 20 to the multifunction device 10, as an HTTP request for requesting updating of settings or execution of virus scanning.

1.4.3 Setting Processing

Setting screen display processing to be executed by the terminal device 20 is described with reference to FIG. 9. The setting screen display processing is processing of displaying, on the displayer 240 of the terminal device 20, a setting screen, which is a screen for executing settings of the multifunction device 10. The setting screen display processing is executed, for example, by causing the controller 200 to read a program stored in the storage 260.

First, the controller 200 transmits, to the multifunction device 10, a setting screen request via the communicator 290 in response to a user operation of displaying a setting screen (step S150).

Subsequently, in a case where the controller 200 (setting screen displayer 202*a*) has received setting screen display information from the multifunction device 10, the controller 200 displays a setting screen on the displayer 240, based on the setting screen display information (step S152). For example, the controller 200 reads and executes the Web browser application 262, and achieves a Web browser function. Further, the setting screen displayer 202*a* displays a setting screen (Web operation UI) of the multifunction device 10 by displaying a Web page based on the setting screen display information received from the multifunction device 10. The Web operation UI includes, for example, a button (e.g., [register] button), which is displayed in a state that a setting content is changeable, and is configured to apply the setting content changed by the user to the multifunction device 10 for each setting item; and a button (e.g., [execute scanning now] button) for requesting virus scanning execution.

Subsequently, in a case where a new setting content is input by the user via the operation acceptor 250 for the setting content displayed on the setting screen (step S154; Yes), the controller 200 reflects the new setting content to the setting screen (step S156). Note that, in a case where the controller 200 determines that a new setting content has not been input, the processing of step S156 is omitted (step S154; No).

Subsequently, the controller 200 determines whether a request for updating the setting content has been made by the user (step S158). The request for updating the setting content is a request for reflecting the setting content of the multifunction device 10 that has been changed in the terminal device 20 to the multifunction device 10. For example, the controller 200 determines that a request for updating the setting content has been made, in a case where the register button displayed on the Web operation UI has been selected.

In a case where a request for updating the setting content has been made, the controller 200 (setting content transmitter 202*b*) transmits, to the multifunction device 10 via the communicator 290, a setting update request including information (setting content displayed on the setting screen displayed on the displayer 240) on a setting content after updating (step S158; Yes→step S160). Note that, in a case where the controller 200 determines that a request for updating the setting content has not been made, the processing of step S160 is omitted (step S158; No).

Subsequently, the controller 200 determines whether virus scanning execution has been requested (step S162). For example, the controller 200 determines that virus scanning execution has been requested, in a case where the button for virus scanning execution displayed on the Web operation UI has been selected.

In a case where virus scanning execution has been requested, the controller 200 transmits a virus scanning execution request to the multifunction device 10 via the communicator 290 (step S162; Yes→step S164). Note that, in a case where the controller 200 determines that a request for virus scanning execution has not been made, the processing of step S164 is omitted (step S162; No).

Subsequently, the controller 200 determines whether an operation of hiding the setting screen has been performed (step S166). In a case where the operation of hiding the setting screen has been performed, the controller 200 terminates the processing illustrated in FIG. 9 (step S166; Yes), and in a case where the operation of hiding the setting screen has not been performed, the processing returns to step S154 (step S166; No).

Figure 8:
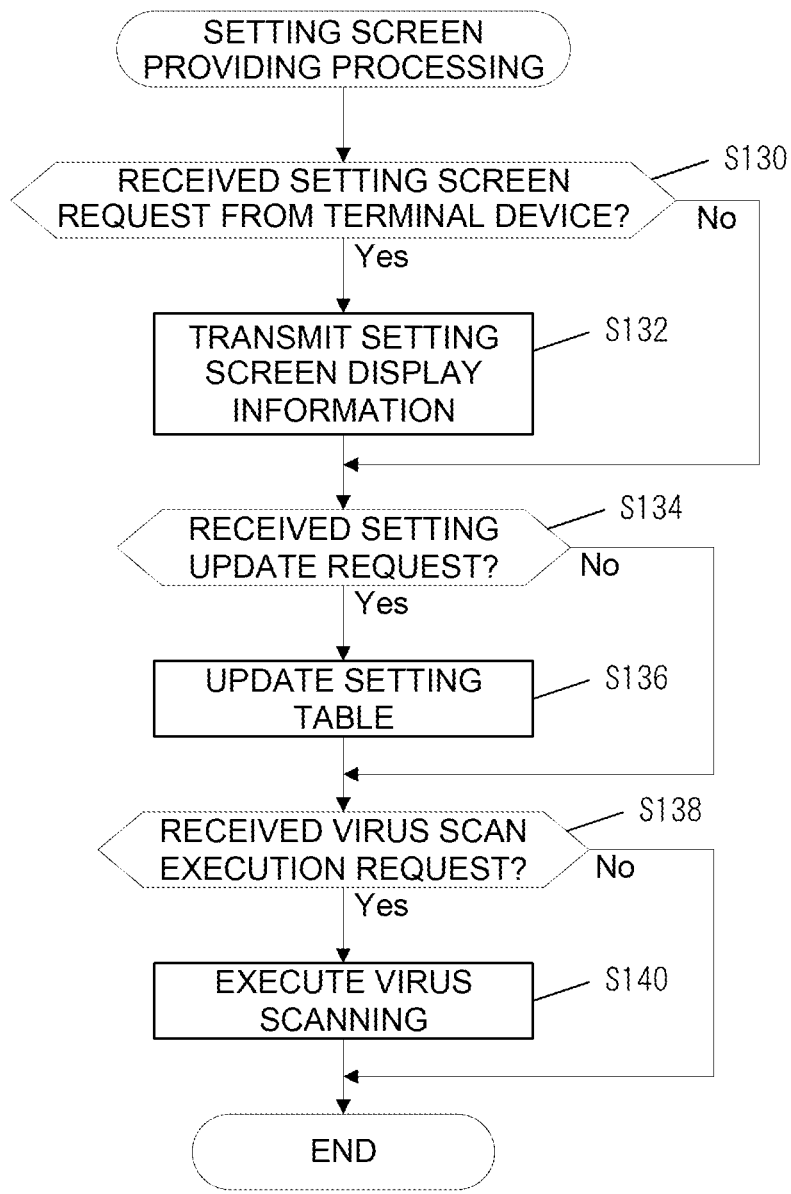
FIG. 8 is a flowchart illustrating a flow of the setting screen providing processing according to the first embodiment.
Figure 9:
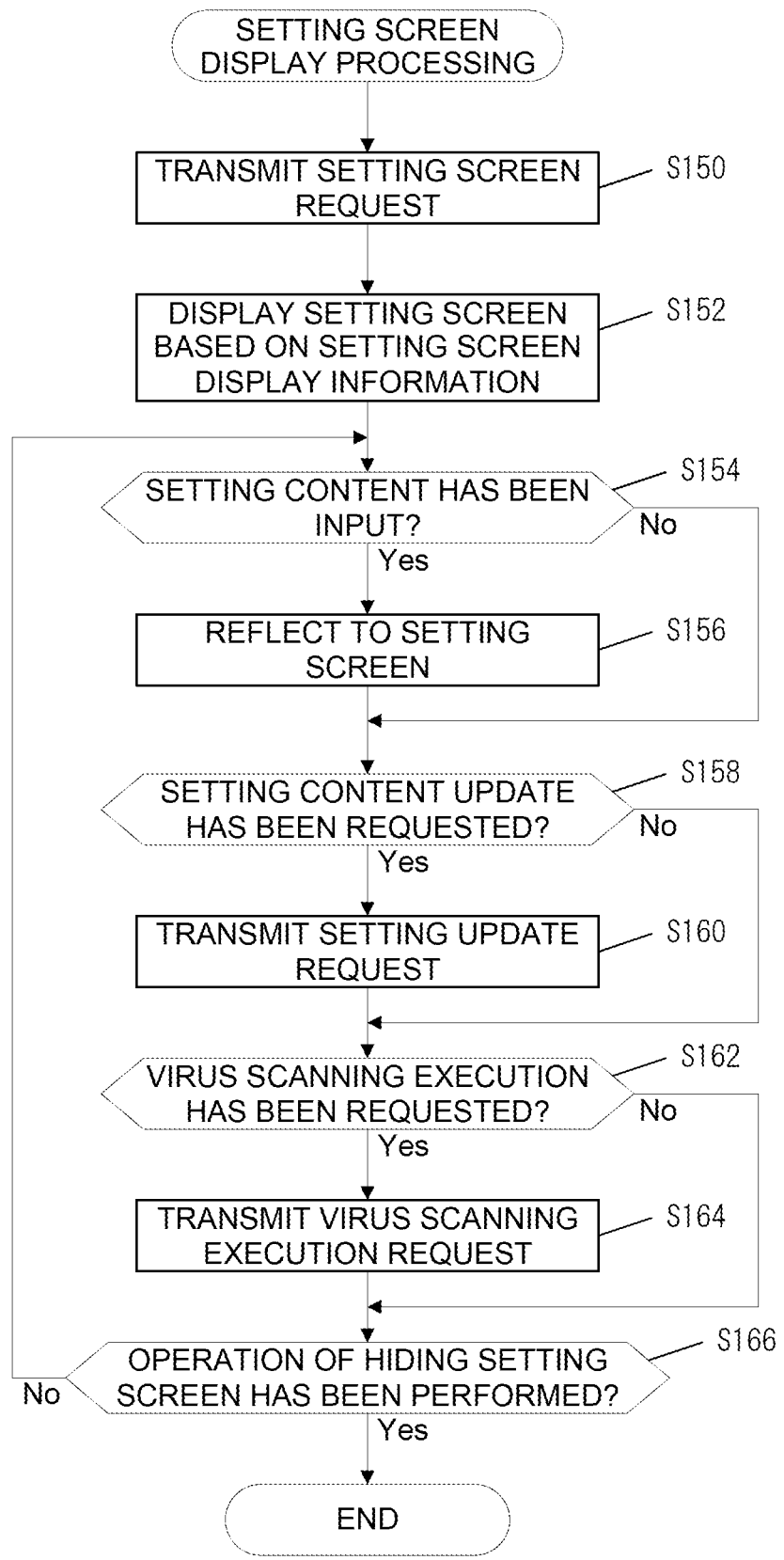
FIG. 9 is a flowchart illustrating a flow of setting screen display processing according to the first embodiment.

In this way, the multifunction device 10 executes the pieces of processing illustrated in FIGS. 7 and 8, and the terminal device 20 executes the processing illustrated in FIG. 9, thus enabling to check and change various settings (e.g., a schedule for executing virus scanning) related to virus quarantine, and execute virus scanning. Note that, regarding the pieces of processing described in FIGS. 7 through 9, the order of steps may be changed, or some of the steps may be omitted to the extent that there is no inconsistency.

1.5 Operation Example

Figure 10:
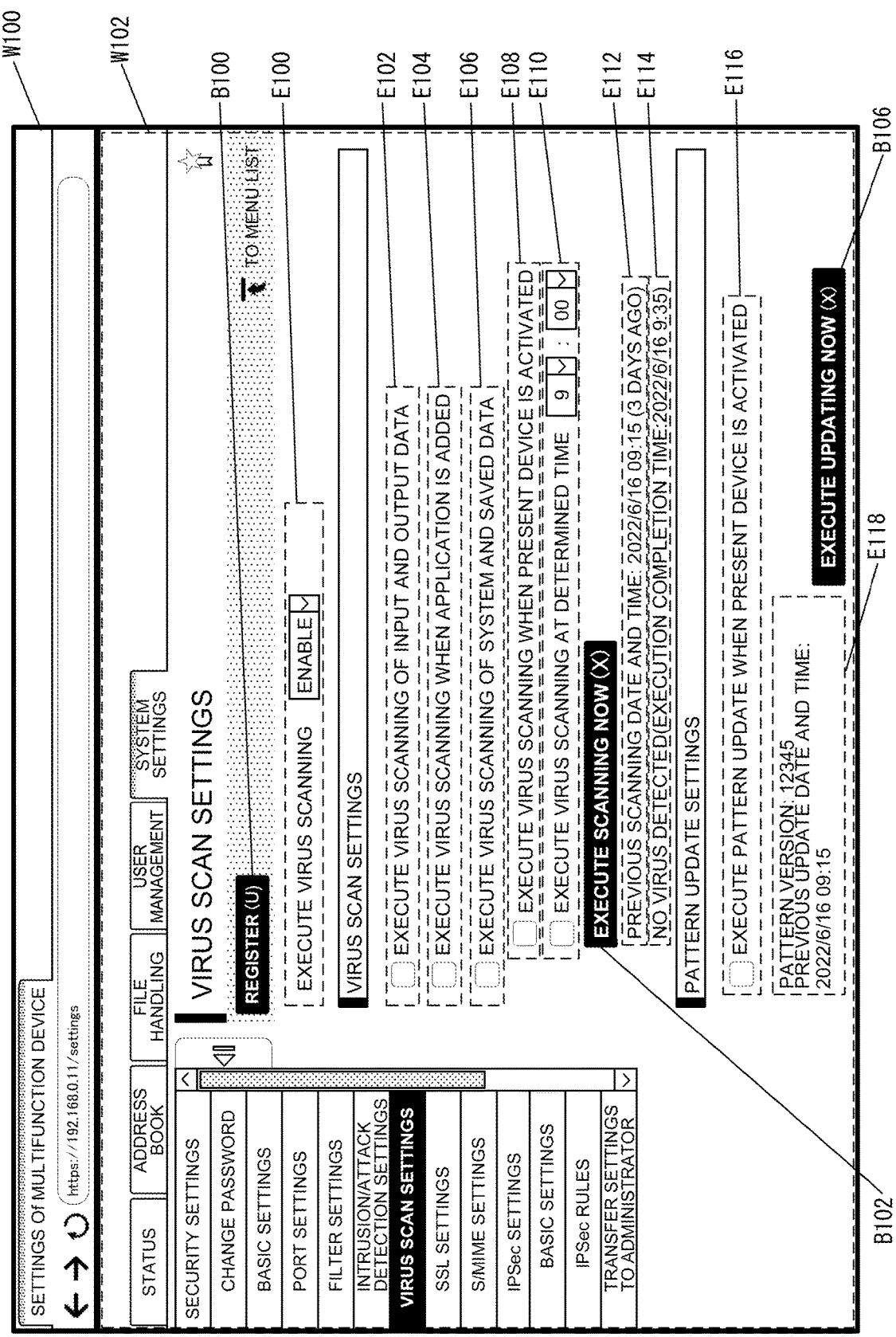
FIG. 10 is a diagram illustrating a screen example of a setting screen according to the first embodiment.

A Web browser W100, and a screen example of a setting screen W102 displayed on the Web browser W100 are described as an operation example of the present example embodiment with reference to FIG. 10. The setting screen W102 is a screen (Web operation UI) for checking and changing various settings related to virus quarantine. The setting screen W102 can be displayed, for example, in a case where a function (a kit for virus scanning, or an application for achieving a virus scanning function) for executing virus scanning is added, or the function is enabled (activated) in the multifunction device 10.

Since the setting screen W102 is displayed inside the Web browser W100, it is possible to display the setting screen W102 on any device loaded with a Web browser. Therefore, as long as the multifunction device 10 is loaded with a Web browser, it is possible to display the setting screen W102 on the displayer 140 of the multifunction device 10. Also, as long as the terminal device 20 is loaded with a Web browser, it is possible to display the setting screen W102 on the displayer 240 of the terminal device 20.

The setting screen W102 further includes an area for checking and changing a setting content, and buttons for performing predetermined operations.

A button B100 is a button for reflecting a changed setting content to the multifunction device 10 by causing the multifunction device 10 to register a setting content input on the setting screen W102.

An area E100 is an area for switching settings between enabling and disabling a virus scanning function. For example, the virus scanning function is "disabled" by default. In a case where the virus scanning function is disabled, a checkbox, a drop-down list, and a button displayed below the area E100 may be made inoperable (grayed out or hidden). In this case, allowing the user to switch the virus scanning function to "enabled" makes it possible to operate the checkbox and other items displayed below the area E100.

An area E102 is an area for switching settings between enabling and disabling virus scanning of input and output data. For example, the settings are "enabled" by default. In a case where virus scanning of input and output data is "enabled", the quarantine processor 108 executes virus scanning for data to be input and output at a timing when the data are input from another device such as another facsimile device or a USB memory, and at a timing when the data are output to another device.

An area E104 is an area for switching settings between enabling and disabling virus scanning when an application is added. For example, the settings are "enabled" by default. In a case where virus scanning when an application is added is "enabled", the quarantine processor 108 executes virus scanning for data of an application at a timing when the application is added to the multifunction device 10.

An area E106 is an area for switching whether to execute virus scanning for system data, or data stored in the input data storage area 166. In a case where virus scanning is executed for system data or data stored in the input data storage area 166, the settings allow virus scanning to be executed at an activation time of an application, at regular intervals, or on-demand. For example, the settings are enabled by default. In a case where the setting are disabled, an area E108, an area E110, and a button B102 may be grayed out.

The area E108 is an area for switching settings as to whether to execute virus scanning when the multifunction device 10 is activated, and, for example, the settings are "enabled" by default. Also, the area E110 is an area for setting whether to execute virus scanning at a predetermined time, and the time when virus scanning is executed. For example, the settings as to whether to execute virus scanning at a predetermined time are "disabled" by default. The time when virus scanning is executed may also be settable on a monthly or weekly basis.

The button B102 is an instruction means for instructing immediate execution of virus scanning (on-demand virus scanning). The button B102 may be grayed out or hidden, in a case where the on-demand virus scanning function is "disabled".

Including the areas and buttons described above on the setting screen allows the user to check, on a setting screen (main unit operation UI) displayed on an operation terminal of the multifunction device 10, display of virus scan settings (such as schedule settings and execution range settings), an execution result, an execution completion time, and the like. The user can also make appropriate determination such as whether to execute virus scanning, based on a date and time when virus scanning was executed, and an elapsed period of time since previous virus scanning.

The setting screen may also include an area that displays information for use in checking a status of virus scanning by the user. An area E112 is an area that displays a completion time of previous virus scanning execution (latest scanning date and time), and an elapsed period of time since previous virus scanning. An area E114 is an area that displays an execution result (inspection result) of previous virus scanning. The area E114 may include information indicating whether a virus has been detected, and information on a completion time of virus scanning. The user (e.g., an administrator of the multifunction device 10) can determine a virus scanning execution timing by checking the area E112 and the area E114. Note that, the setting screen may include the areas described above, or may display information other than the information described above. For example, the setting screen may include an execution status of virus scanning (such as whether virus scanning is in progress or a date and time of next scanning). The setting screen may also display information for use in checking a result (such as a virus detection record) of a virus scanning operation by the user.

In addition, the setting screen may include an area on which update settings of virus pattern data are executed, and an update status of virus pattern data is displayed. An area E116 is an area for switching whether to update virus pattern data when the multifunction device 10 is activated. The settings as to whether to update virus pattern data are, for example, "enabled" by default.

In addition, an area E118 is an area that displays an update status of virus pattern data. The area E118 displays, for example, a date and time when virus pattern data have been updated most recently. Checking the area E118 allows the user (e.g., an administrator of the multifunction device 10) to appropriately determine whether to execute virus scanning, or whether a virus scanning execution timing is appropriate, based on external information (such as updating of a virus pattern).

In addition, a button B106 is a button for immediately executing updating of virus pattern data. Note that, regarding functions related to updating of virus pattern data, the multifunction device 10 may include a function of suspending updating of virus pattern data, and a function of setting update scheduling of virus pattern data. In this case, a setting screen may be configured according to the functions related to updating of virus pattern data included in the multifunction device 10.

Note that, the above description has been made based on a premise that a setting screen (Web operation UI) of the multifunction device 10 is displayed on a Web browser of the terminal device 20, but a setting screen may be displayed via an application, instead of a Web browser. For example, an application for operating the multifunction device 10 may be installed in advance in the terminal device 20, and when an operation of displaying a setting screen is performed on the application, a setting screen of the multifunction device 10 may be displayed. In this case, the multifunction device 10 transmits, to the terminal device 20, a setting content stored in the setting table 172, as setting screen display information. The terminal device 20 displays the setting content received from the multifunction device 10 on the application, and accepts an operation of changing the setting content by the user. In a case where an operation of reflecting the setting content to the multifunction device 10 is performed, the terminal device 20 may transmit a setting update request to the multifunction device 10, and in a case where an operation of requesting virus scanning execution is performed, the terminal device 20 may transmit a virus scanning execution request to the multifunction device 10.

Further, the above description has been made based on a premise that virus quarantine processing is virus scanning. However, in addition to virus scanning, processing of removing a virus, or processing of quarantining and deleting virus-infected data may also be executed, as virus quarantine processing.

In this way, the multifunction device according to the present embodiment is loaded with a virus scanning function (application), enables virus scanning execution and schedule settings on an operation screen to be displayed on the displayer of the main unit of the multifunction device, and executes virus scanning, based on the settings.

In addition, the multifunction device according to the present embodiment provides a function (Web operation UI) of displaying a setting screen of the multifunction device to a terminal device connected to a network. This allows the user such as an administrator of the multifunction device to set and operate virus scanning of the multifunction device by using a Web browser or other means of the terminal device such as a PC, in a case where it is difficult to operate a setting screen (main unit operation UI) to be displayed on the multifunction device, such as a case where the user is present at a location away from the multifunction device, or a case where the user manages a large number of multifunction devices. In addition, the user of the multifunction device 10 can remotely check an execution status of virus scanning and an update status of virus pattern data of the multifunction device from the terminal device, without checking a setting screen to be displayed on the multifunction device. Also, the user can remotely execute virus scanning for the multifunction device via the terminal device.

In other words, according to the present embodiment, the user can set, check, and change a schedule of virus scanning, and check a status and a result of virus scanning via a setting screen to be displayed on the multifunction device or the terminal device. In addition, the multifunction device according to the present embodiment periodically executes virus scanning, based on user settings, and in a case where the user instructs immediate execution of virus scanning, virus scanning is executed. The user can securely execute virus scanning by executing settings, while taking into account an operating status of the multifunction device. In this way, the multifunction device according to the present embodiment can execute virus scanning without delay.

2. Second Embodiment

Next, a second embodiment is described. The second embodiment is an embodiment, in which, in addition to the processing described in the first embodiment, virus scanning is re-executed (retried), in a case where virus scanning execution is inhibited in a case where virus scanning is set to be periodically executed. The present embodiment is an embodiment in which FIG. 7 in the first embodiment is replaced by FIG. 11. Note that, the same processing is indicated by the same reference sign, and description thereof is omitted.

In a multifunction device 10, in a case where processing of high load (e.g., a job for using a basic function) is being executed, virus scanning may not be able to be executed for a reason that a priority is given to execution of the processing. In other words, the multifunction device 10 may be in a state that virus scanning cannot be executed due to competition with another application. Generally, a user can periodically execute virus scanning of the multifunction device 10 by setting a virus scanning schedule in a time period when a use frequency of the multifunction device 10 is low. For example, a user (e.g., an administrator of the multifunction device 10 or the like) may presume that virus scanning of the multifunction device 10 is executable at 23:00 without a problem, in a case where the multifunction device 10 is not used by a general user at 23:00. In this case, the user can set a schedule in such a way that virus scanning is activated at 23:00. However, even during a time when it is conceived that the multifunction device 10 is not used, execution of periodical virus scanning may be inhibited due to execution of high-load processing in the multifunction device 10 by a user operation, or receiving data from the outside. In view of the above, the multifunction device 10 according to the present embodiment re-executes (re-scans) virus scanning, in a case where virus scanning execution is inhibited. Note that, re-execution of virus scanning means executing virus scanning again from the beginning.

2.1 Flow of Processing

Main processing according to the preset embodiment is described with reference to FIG. 11. In the present embodiment, a controller 100 (quarantine processor 108) executes virus scanning processing, when the controller 100 has reached a state in which virus scanning is executed (step S200; Yes→step S202). A time when the controller 100 has reached a state in which virus scanning is executed is a time when the time reached a date and time of virus scanning execution that is set in advance, or a time when an operation for executing on-demand virus scanning has been performed. Further, the virus scanning processing is processing of executing, stopping, and re-executing virus scanning according to a status of the multifunction device 10, and is executed by the quarantine processor 108.

The virus scanning processing is described with reference to FIG. 12. First, the quarantine processor 108 starts virus scanning (step S250).

Subsequently, the quarantine processor 108 determines whether virus scanning execution is inhibited. A case in which virus scanning execution is inhibited is a case where it becomes necessary to execute processing that cannot be executed in parallel with virus scanning. In the present embodiment, the case where it becomes necessary to execute processing that cannot be executed in parallel with virus scanning is one of the following two cases:

(1) a case where data are input from another device
(2) a case where the multifunction device 10 is operated by the user (a case where a basic function is executed)

In view of the above, the quarantine processor 108 determines whether the multifunction device 10 has reached one of the two cases described above. First, the quarantine processor 108 determines whether data have been input from another device (step S252). The data to be input from another device are data of an image to be subjected to image processing by the multifunction device 10, and for example, are fax data to be processed for reception or storage, or an image file or a document file to be output. Therefore, the case where data are input from another device is, for example, a case where it becomes necessary to input fax data because the fax data are received from another device, or when data are read from a storage device such as a USB memory connected to a connector 180.

In a case where data have not been input from another device, the quarantine processor 108 determines whether the multifunction device 10 has been operated by the user (step S252; No→step S254).

In a case where the multifunction device 10 is not operated by the user, the quarantine processor 108 determines whether virus scanning has been completed (step S254; No→step S256). In a case where virus scanning has been completed, the quarantine processor 108 terminates the processing illustrated in FIG. 12 (step S256; Yes). On the other hand, in a case where virus scanning has not been completed, the quarantine processor 108 returns to step S252 (step S256; No→step S252).

On the other hand, in a case where the quarantine processor 108 determines that data have been input from another device (step S252; Yes), or in a case where the multifunction device 10 has been operated (step S254; Yes), virus scanning is stopped (step S258). Note that, in a case where virus scanning is stopped in step S258, the quarantine processor 108 may store, in a storage 260, information (a log) indicating that virus scanning has been inhibited, assuming that virus scanning execution has been inhibited.

Subsequently, the quarantine processor 108 determines a date and time when the use frequency of the multifunction device 10 is lowered next time (step S260). The date and time when the use frequency of the multifunction device 10 is lowered next time is a date and time when the use frequency of the multifunction device 10 is lowered among dates and times later than the date and time when virus scanning was stopped, and is a date and time closest to a current time. For example, the quarantine processor 108 determines a date and time when the use frequency is lowered next time by using one of the following methods.

(1) Estimation Method Based on Job History Information (Usage Status of Multifunction Device 10)

The quarantine processor 108 acquires a usage status of the multifunction device 10 in the past, based on job history information stored in a job history information storage area 170, and estimates a date and time when the use frequency of the multifunction device 10 is lowered, taking into account the usage status of the multifunction device 10 in the past. For example, the quarantine processor 108 reads job history information on a job that has been executed in the past, and tallies the number of job occurrences (number of executions) for each time period by tallying the number of job occurrences for each predetermined length of time (e.g., per hour). Further, the quarantine processor 108 determines one or more time periods in which the number of job occurrences is equal to or less than a predetermined number of times, and sets a time (e.g., a start time of the time period or a middle time of the time period) included in the determined time period, as the time when the use frequency of the multifunction device 10 is low. Furthermore, the quarantine processor 108 determines, as a date and time when the use frequency is lowered next time, a date and time indicating an earliest time after virus scanning was stopped, among times when the use frequency of the multifunction device 10 is low.

For example, in a case where virus scanning is executed every day, the quarantine processor 108 determines a time when the use frequency of the multifunction device 10 is low by using job history information on a job that has been executed on the previous day, and determines, as a date and time indicating a time when the use frequency of the multifunction device 10 is lowered, a date and time that indicating an earliest time among the determined times. In a case where the date and time when virus scanning execution was stopped is 23:00 on April 1, and a time when the use frequency of the multifunction device 10 is low is 1:00, the quarantine processor 108 determines, as a date and time when the use frequency of the multifunction device 10 is lowered next time, 1:00 on April 2, which is a date and time that reaches 1:00 earliest after 23:00 on April 1. Note that, in a case where virus scanning is executed every week, the quarantine processor 108 may determine a day of the week when the use frequency of the multifunction device 10 is lowered, based on job history information on a job that has been executed in an immediately previous week, and determine a time when the use frequency of the multifunction device 10 is low in the determined day of the week. Also, in a case where the quarantine processor 108 executes virus scanning every month, the quarantine processor 108 may determine a day when the use frequency of the multifunction device 10 is lowered in an immediately previous month, and determine a time when the use frequency of the multifunction device 10 is low in the determined day.

(2) Method of Determining Date and Time after Predetermined Time has Elapsed Since Current Date and Time The quarantine processor 108 determines, as a date and time when the use frequency of the multifunction device 10 is lowered next time, a date and time when a predetermined time (e.g., 10 minutes) has elapsed since a current date and time. Note that, the predetermined time may be determined in advance, or may be settable by the user. The quarantine processor 108 may also estimate an end date and time of a currently executed job, and determine, as a date and time when the use frequency of the multifunction device 10 is lowered next time, an appropriate date and time after the end date and time of the job.

(3) Determination Method Based on Predetermined Time when Use Frequency is Low

The multifunction device 10 allows to set in advance a plurality of times when the use frequency is low. The quarantine processor 108 determines, as a date and time when the use frequency is lowered next time, a date and time indicating a time when the use frequency of the multifunction device 10 is lowered next time. For example, in a case where a current date and time is 23:00 on April 1, and a time when the use frequency of the multifunction device 10 is low is set to 3:00, the quarantine processor 108 determines 3:00 on April 2, as a date and time when the use frequency of the multifunction device 10 is lowered next time.

Subsequently, the quarantine processor 108 sets the date and time determined in step S260, as a date and time when virus scanning is executed next time (step S262).

The quarantine processor 108 also notifies a predetermined user (e.g., an administrator of the multifunction device 10) that virus scanning could not be executed by a user operation, or that virus scanning could not be executed at a set date and time (step S264). A destination of the notification may be set in advance. Note that, in a case where a function of notifying that virus scanning could not be executed at a set date and time is disabled, or in a case where the multifunction device 10 does not include the function, the quarantine processor 108 omits the processing of step S264.

Figure 11:
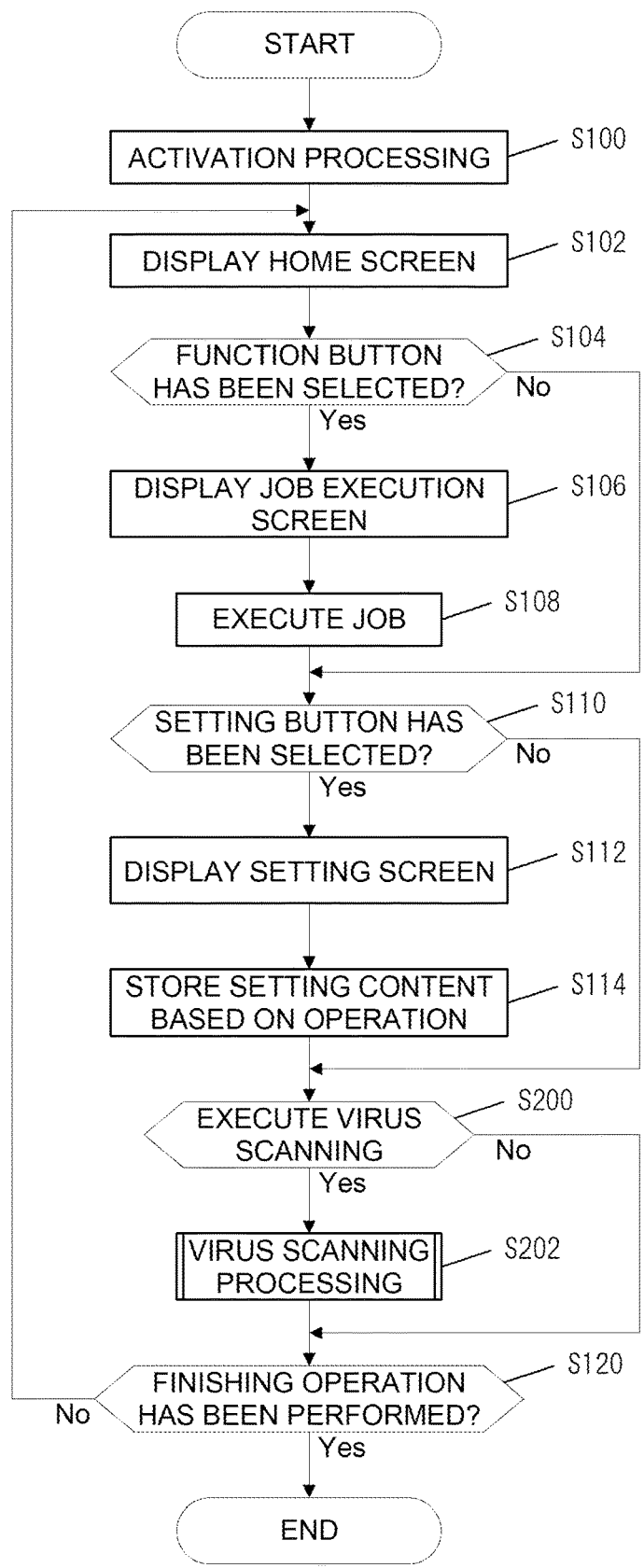
FIG. 11 is a flowchart illustrating a flow of main processing according to a second embodiment.
Figure 12:
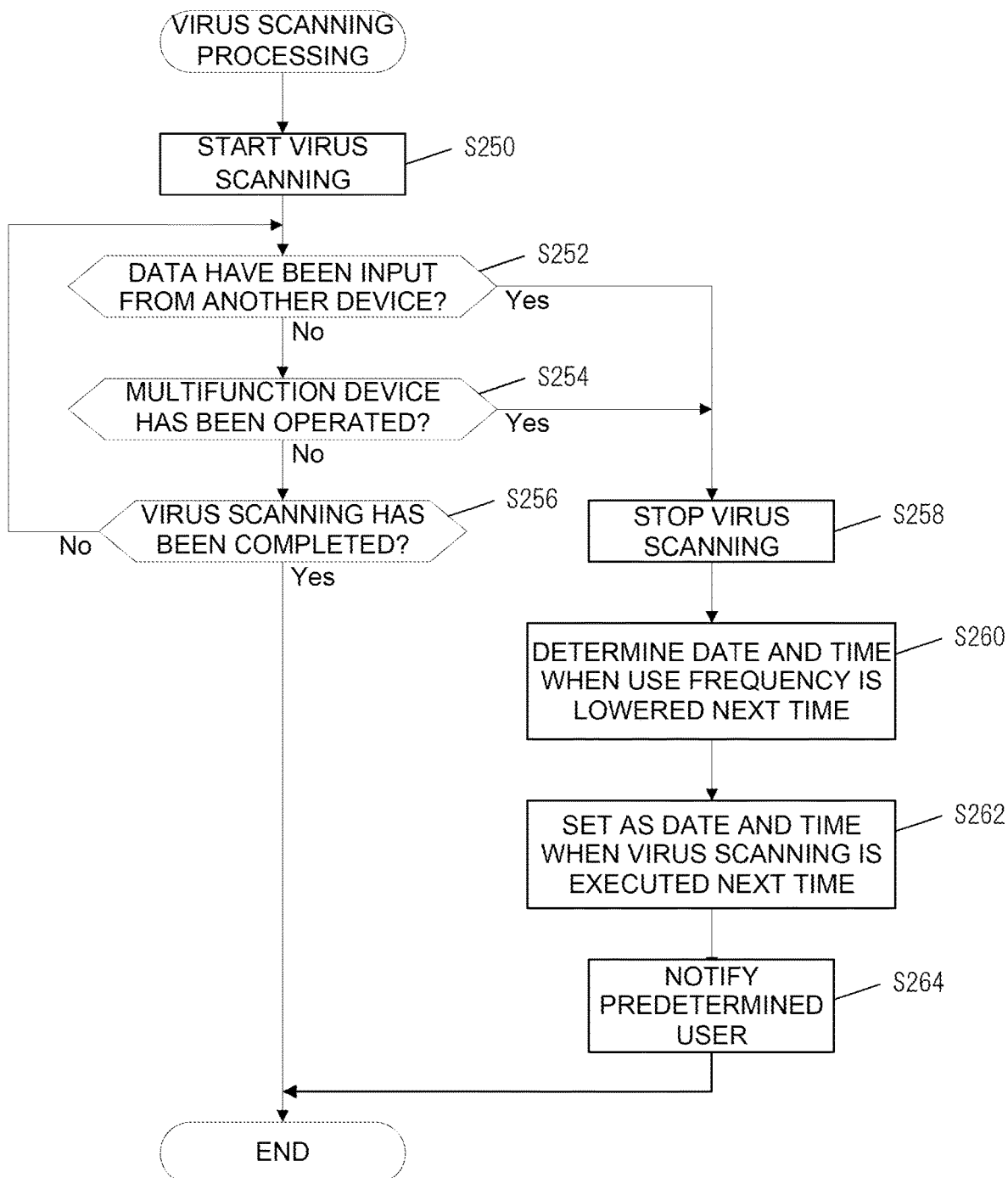
FIG. 12 is a flowchart illustrating a flow of virus scanning processing according to the second embodiment.

After executing the processing described above, the quarantine processor 108 terminates the processing illustrated in FIG. 12. Thus, when the time has reached the date and time that is set as the date and time when virus scanning is executed next time, the time becomes the date and time of virus scanning execution in step S200 in FIG. 11, and it is determined that the multifunction device 10 becomes a state in which virus scanning is executed, and virus scanning processing is executed again.

2.2 Operation Example

Figure 13:
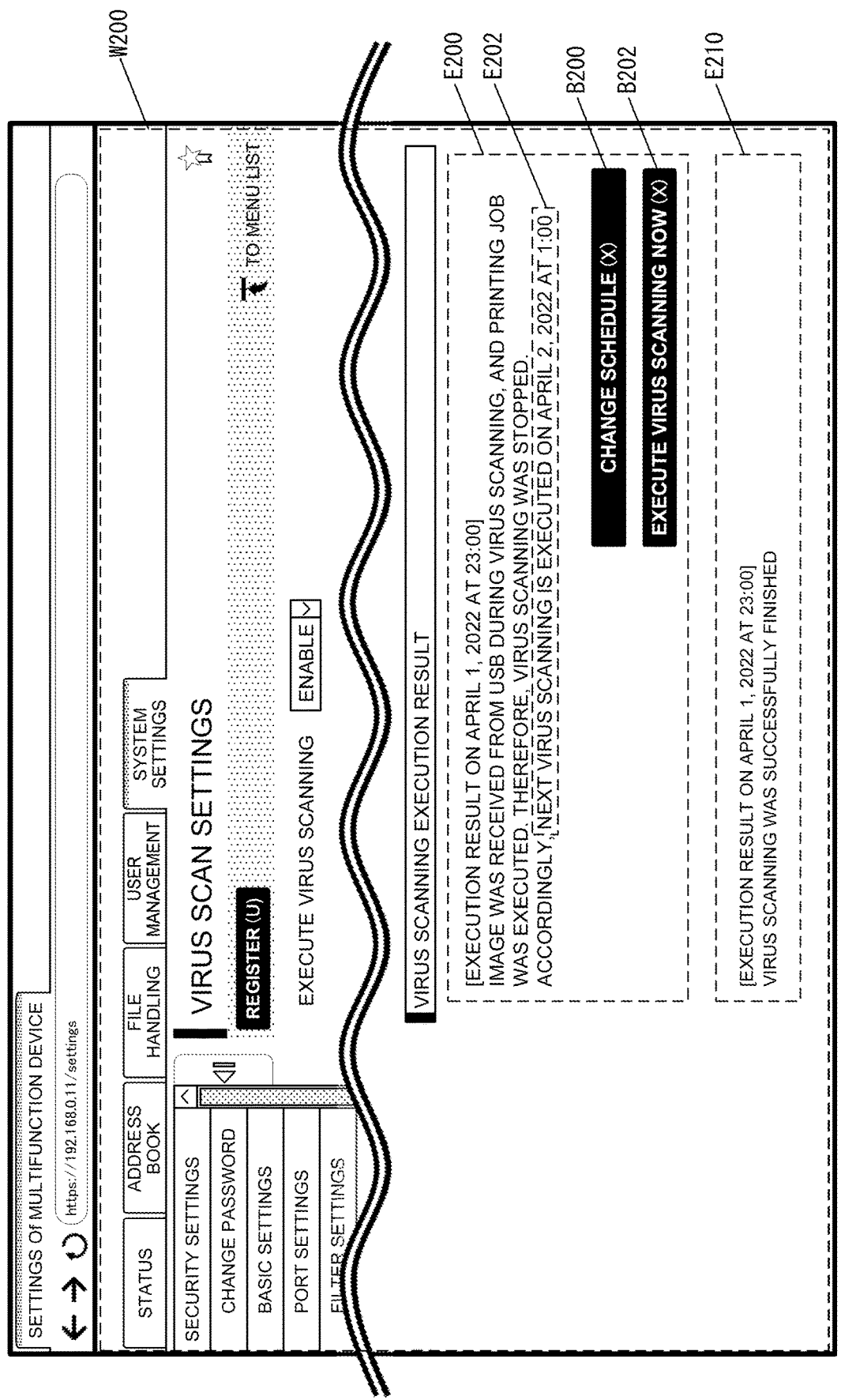
FIG. 13 is a diagram illustrating a screen example of a setting screen according to the second embodiment.

FIG. 13 is a diagram illustrating a screen example of a setting screen W200 according to the present embodiment. The setting screen W200 is displayed as a Web operation UI, for example, on a displayer 140 of the multifunction device 10, or on a displayer 240 of a terminal device 20. As illustrated in FIG. 13, the setting screen W200 may include an area E200 that displays information indicating that virus scanning has been inhibited, in a case where virus scanning has been inhibited. The area E200 may include a date and time when virus scanning is re-executed (a date and time when the use frequency of the multifunction device 10 is lowered next time) (E202 in FIG. 13). The setting screen W200 may also include a button B200 for displaying an area in which a virus scanning schedule is set, and a button B202 for immediately executing virus scanning. This allows the user of the multifunction device 10 to recognize that virus scanning has been inhibited, and to change the schedule of executing virus scanning or to immediately execute virus scanning.

Note that, the setting screen W200 may also display information indicating that virus scanning execution has been completed successfully, even when virus scanning execution has been completed successfully without being inhibited (E210 in FIG. 13). The user of the multifunction device 10 can recognize that a schedule for executing virus scanning is appropriate by checking the information indicating that virus scanning execution has been successfully completed.

Note that, in a case where virus scanning execution is inhibited again at a time of re-execution of virus scanning, the quarantine processor 108 may set again a date and time when virus scanning is re-executed. The multifunction device 10 may also set in advance the number of times virus scanning can be re-executed, and may re-execute (re-try) virus scanning several times. In this case, in a case where virus scanning has not been completed even after virus scanning was re-executed the number of times the quarantine processor 108 can re-execute virus scanning, the quarantine processor 108 terminates virus scanning without re-executing virus scanning.

Note that, there may be a case that a low power function such as a sleep function is enabled in the multifunction device 10, and an operating state of the multifunction device 10 is a sleep state at an execution time of virus scanning. In such a case, a controller 100 may automatically change the operating state of the multifunction device 10 from the sleep state to a normal state (activated state) by setting virus scanning execution as a trigger.

In this way, in a case where virus scanning execution competes with execution of another function such as a job in which a basic function of the multifunction device is used, and virus scanning execution becomes difficult (inhibited) because execution of the basic function of the multifunction device has been prioritized, the multifunction device according to the present embodiment temporarily stops virus scanning. Further, the multifunction device according to the present embodiment resumes or re-executes virus scanning after execution of the basic function of the multifunction device is completed. This allows the multifunction device according to the present embodiment to securely execute virus scanning, even when virus scanning execution is inhibited.

3. Third Embodiment

Next, a third embodiment is described. The third embodiment is an embodiment in which control is performed in such a way that a virus scanning execution result becomes more accurate, in a case where resources to be scanned are operated in competition, a file to be scanned is in use, or execution of a basic function is prioritized when executing virus scanning.

Herein, competing resources are a memory, an SSD (HDD), which is an information saving destination, a CPU, and the like. A virus scanning application may use a large capacity of a memory at a time of execution. On the other hand, also in a case where a job such as a large amount of scanning is executed, a large capacity of memory may be used due to execution of the job. In a case where a virus scanning application and a job are executed, a memory to be used by the virus scanning application may become insufficient, and execution of the virus scanning application may have to wait. In a case where a saving destination of information stored in the memory is an SSD, the information in the memory may be temporarily stored in the SSD. In this case, the capacity of the SSD may be short of capacity. The capacity shortage of the SSD is also a kind of resource competition. Resources such as a memory and an SSD are released when job execution is completed. Therefore, another application such as virus scanning can run, but virus scanning may be stopped until job execution is completed.

In addition, although an application runs by using a CPU, the CPU may be occupied by a task whose execution priority is high. In this case, execution of a task whose priority is low has to wait. Generally, execution of a job instructed by the user has a high execution priority, as compared with virus scanning execution. Therefore, even when the priority of processing (such as virus removal and data recovery) after virus detection is high, in a case where the priority of virus scanning execution is low, virus scanning execution may be stopped, and processing of a high priority is executed.

In a case where virus scanning execution is stopped due to resource competition as described above, a state of a scanning target may change between when the resource competition has occurred, and when the resource competition is resolved (after the resource is released). The present embodiment is an embodiment in which a controller 100 executes virus scanning appropriately even in a case described above.

In the present embodiment, a multifunction device 10 executes, as main processing, the processing illustrated in FIG. 11 of the second embodiment. Also in the present embodiment, a quarantine processor 108 executes the processing illustrated in FIG. 14, as virus scanning processing to be executed in step S202 in FIG. 11.

3.1 Flow of Processing

Figure 14:
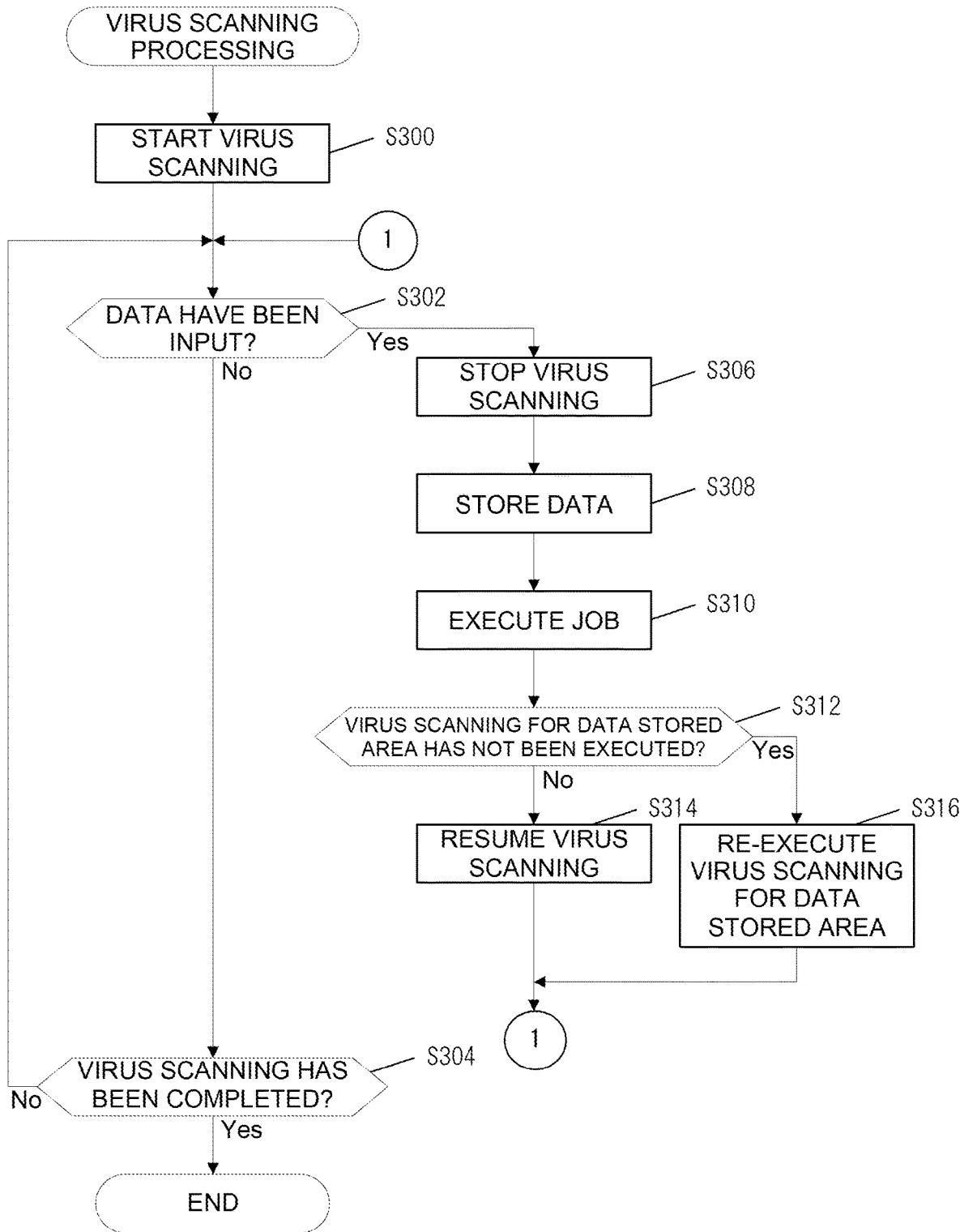
FIG. 14 is a flowchart illustrating a flow of virus scanning processing according to a third embodiment.

Virus scanning processing according to the present embodiment is described with reference to FIG. 14. First, the quarantine processor 108 starts virus scanning (step S300), and determines whether data have been input (step S302). Cases that data have been input are, for example, the following cases.
(1) When the controller 100 reads data from a storage device such as a USB memory connected to a connector 180 when executing a basic function.
(2) When the controller 100 inputs an image via an image inputter 120 when executing a basic function.
(3) When the controller 100 receives data from another equipment via a communicator 190.

In a case where data have not been input, the quarantine processor 108 determines whether virus scanning has been completed (step S302; No→step S304). In a case where virus scanning has been completed, the quarantine processor 108 terminates the processing illustrated in FIG. 14 (step S304; Yes), and in a case where virus scanning has not been completed, the quarantine processor 108 returns to step S302 (step S304; No→step S302).

On the other hand, in a case where the quarantine processor 108 determines that data have been input in step S302, the quarantine processor 108 stops virus scanning (step S302; Yes→step S306). The controller 100 also stores, in a predetermined area (e.g., an input data storage area 166), the data input in step S302 (step S308).

Subsequently, the controller 100 executes a predetermined job (step S310). For example, in a case where the user selects use of a function (print function) of printing data transmitted from a USB memory to the multifunction device 10, a job of printing the data is executed.

Subsequently, when virus scanning is stopped in step S306, the quarantine processor 108 determines whether virus scanning for the area where data are stored in step S308 has not been executed (step S312). For example, in a case where virus scanning for the area where data are stored in step S308 has not been completed, and virus scanning for the area is not in progress, the quarantine processor 108 determines that virus scanning for the area has not been yet executed. On the other hand, when the area where data are stored in step S308 has already been scanned for viruses, or when virus scanning is in progress, the quarantine processor 108 determines that virus scanning for the area has been executed (not in an unexecuted state).

When virus scanning for the area where data are stored in step S308 has not yet been executed, the quarantine processor 108 resumes virus scanning as it is (step S312; Yes→step S314).

On the other hand, in a case where virus scanning for the area where data are stored in step S308 has been executed, the quarantine processor 108 re-executes virus scanning for the area (step S316).

In this way, in a case where data have been input during virus scanning, and when virus scanning for an area where the data are stored has already been executed, the quarantine processor 108 re-executes virus scanning for the area. This allows the quarantine processor 108 to detect a virus by executing virus scanning again, even in a case where a file infected with the virus is input, and the file is stored in an area that has been scanned for viruses or that is in progress of virus scanning. Consequently, the quarantine processor 108 can acquire a more accurate virus scanning execution result.

3.2 Operation Example

An operation example of the multifunction device 10 according to the present embodiment is described by using a specific example. For example, when virus scanning is being executed in the multifunction device 10, a printing function and the like may be executed after data have been transmitted from a USB memory to the multifunction device 10 by the user. In this case, the multifunction device 10 stops virus scanning, and resume or re-executes virus scanning after printing is completed.

Herein, the multifunction device 10 stores data received from a USB memory in the input data storage area 166 ("area 1"). In this case, when the area 1 is set as a target for virus scanning, and virus scanning is executed for the area 1 before the virus scanning is stopped, the multifunction device 10 executes virus scanning again for the area 1 after a job of a function (e.g., a printing function) executed by the user is completed. This allows the multifunction device 10 to acquire a more accurate virus scanning execution result.

Note that, the description above has been made based on a premise that the quarantine processor 108 stops virus scanning in a case where data have been input. Alternatively, the quarantine processor 108 may also stop virus scanning in a case where data stored in a storage 160 are used or changed. In this case, the quarantine processor 108 detects that target data for virus scanning, or another piece of data stored in the area where the target data are stored has been used or changed during virus scanning execution. Further, after the target data or the another piece of data stored in the area where the target data are stored has been used or changed, the quarantine processor 108 re-scans the target data or the area. Note that, in a case where target data or an area where the target data are stored is re-scanned on a setting screen, the multifunction device 10 may display, on the setting screen (e.g., a Web operation UI), information indicating that re-scanning has been executed, or a virus scanning result by re-scanning.

In this way, the multifunction device according to the present embodiment includes a virus scanning function, and other functions (basic functions) in which functions as the multifunction device are taken into account, and can control the virus scanning function from the Web operation UI. In particular, the multifunction device according to the present embodiment includes an exclusive OR function between a virus scanning function being executed, and a function having a causal relation with the virus scanning function, and causes the Web operation UI to display a virus scanning execution result. The function having a causal relation is, for example, a function of printing data after transmitting the data from a USB memory to the multifunction device 10. In a case where the function is executed, the multifunction device stops virus scanning, and resumes virus scanning or re-scans after execution of the function has been completed.

The multifunction device according to the present embodiment having the features as described above enables to acquire a more accurate virus scanning execution result by executing virus scanning again for a predetermined area after a job is completed, in a case where virus scanning for the area has been executed before virus scanning is stopped.

4. Fourth Embodiment

Next, a fourth embodiment is described. The fourth embodiment is an embodiment in which, in addition to the processing described in the first embodiment, a notification related to virus scanning is made. In the present embodiment, FIG. 4 in the first embodiment is replaced by FIG. 15.

4.1 Functional Configuration

Information to be stored in a setting table 172 according to the present embodiment is described with reference to FIG. 15. In the present embodiment, the following information is stored in the setting table 172, as information related to a notification.

(1) Information Related to Notification on Virus Scanning Execution Result (D400 in FIG. 15)

Information related to a notification on a virus scanning execution result is settings for enabling and disabling a notification function of a virus scanning execution result, and a notification destination (e.g., an e-mail address to which an e-mail including a notification content is transmitted).

(2) Information Related to Notification on Virus Scanning Execution Timing (D402 in FIG. 15)

Information related to a notification on a virus scanning execution timing is settings for enabling and disabling a notification function of a virus scanning execution timing, and a notification destination (e.g., an e-mail address to which an e-mail including a notification content is transmitted).

Herein, the notification function of a virus scanning execution timing is a function of informing the user (e.g., an administrator of a multifunction device 10) of a timing when virus scanning is to be executed. In the present embodiment, the following three timings are used as timings when a notification is made, and it is assumed that it is possible to set whether to make a notification, and to set a condition for making a notification at each of these timings.

(a) When Data Update Frequency is High

In a case where a large number of operations (e.g., an operation of changing or updating a file) are performed for a virus scanning target area (e.g., an input data storage area 166) in a short period of time, and a data update frequency (frequency of operations) is presumed to be high, the multifunction device 10 makes a notification of prompting to manually execute virus scanning. As illustrated in D404 in FIG. 15, the setting table 172 stores in advance whether to notify when the data update frequency is high, and a condition for determining that the data update frequency is high (e.g., frequency information such as "when one hundred or more files have been updated in one hour"). The setting content illustrated in D404 in FIG. 15 may be changeable by the user.

(b) When the Number of Jobs to be Executed is Large or Small

The multifunction device 10 makes a notification of prompting to manually execute virus scanning, or to increase the frequency of virus scanning, in a case where the use frequency the multifunction device 10 is increased, such as a case where the number of jobs to be executed by the multifunction device 10 is large. The condition for determining that the use frequency of the multifunction device 10 is high (e.g., "when the number of jobs to be executed in a day is ten or more") may be set in advance or may be settable by the user. Likewise, a notification of prompting to reduce the frequency of virus scanning may be made, in a case where the use frequency of the multifunction device 10 is lowered, such as a case where the number of jobs to be executed by the multifunction device 10 is small. As illustrated in D406 in FIG. 15, the setting table 172 stores in advance whether to make a notification based on a usage status, and a condition for determining that the usage status has changed (e.g., frequency information such as "when the number of executed jobs in a day is ten or more"). The setting content illustrated in D406 in FIG. 15 may be changeable by the user.

(c) When Update Status of Virus Pattern Data Changes

The multifunction device 10 notifies in a case where an update status of a virus pattern changes, such as when update of virus pattern data becomes frequent, or when a time lag between an update timing of virus pattern data and a virus scanning execution timing becomes large. At this occasion, the multifunction device 10 prompts the user to review the virus scanning execution timing by making a notification. The condition for determining that an update status of a virus pattern has changed (e.g., frequency information such as "when updated four or more times in a month") may be set in advance, or may be settable by the user. As illustrated in D408 in FIG. 15, the setting table 172 stores determination as to whether to make a notification based on an update status of virus pattern data, and a condition for determining that the update status has changed (e.g., "when updated four or more times in one month").

Note that, the notification is made, for example, by transmitting an e-mail in which an address stored in advance in the setting table 172 is used as a transmission destination. Note that, the notification may also be made by causing a predetermined screen such as a setting screen to display a content to be notified.

4.2 Flow of Processing

A flow of notification processing to be executed by the multifunction device 10 is described with reference to FIG. 16. The notification processing is processing of making a notification, based on information related to a notification stored in the setting table 172. The notification processing is executed by causing a controller 100 to read a program stored in a storage 160 in parallel with the main processing illustrated in FIG. 7. Further, the notification processing may be executed periodically (e.g., once an hour), or at a timing when virus scanning is completed.

First, the controller 100 determines whether virus scanning has been executed (step S400). In a case where virus scanning has been executed, the controller 100 notifies a virus scanning execution result when the notification function of a virus scanning execution result is enabled (step S400; Yes→step S402; Yes→step S404).

Note that, the controller 100 may notify a virus scanning execution result each time virus scanning is executed, or may make a notification only in a case where a virus is detected. In other words, the controller 100 may make a notification to the user, as an action when a virus is detected.

Note that, in a case where virus scanning is not executed (step S400; No), or in a case where the notification function of a virus scanning execution result is disabled (step S402; No), the controller 100 omits the processing of step S404.

Subsequently, the controller 100 determines whether the notification condition of a virus scanning execution timing is satisfied (step S406). In a case where the notification condition of a virus scanning execution timing is satisfied, the controller 100 determines the virus scanning execution timing, when the notification function of a virus scanning execution timing is enabled (step S406; Yes→step S408; Yes→step S410). The controller 100 also notifies the virus scanning execution timing determined in step S410 (step S412).

For example, the controller 100 determines and notifies a virus scanning execution timing in the following manner.

(a) When Data Update Frequency is High

In a case where a large number of files have been changed or updated in a short period of time in an area or the like set as a virus scanning target, the controller 100 determines a date and time when a notification is made, as a virus scanning execution timing. In other words, the controller 100 prompts the user to manually execute virus scanning by notifying that virus scanning needs to be executed immediately. This allows the user of the multifunction device 10 to execute virus scanning in the multifunction device 10, based on that a large number of files have been changed or updated in a short period of time in an area set as a virus scanning target, even in a case where periodically executing virus scanning is set.

Note that, the controller 100 may compute a usage status of the area set as a virus scanning target, and notify the user (e.g., an administrator of the multifunction device 10 or the like) of a timing when virus scanning is to be executed. For example, the controller 100 tallies the number of files and an amount of data that have been changed or updated in an area set as a virus scanning target, for each day of the week. At this occasion, the controller 100 notifies the day of the week when the number of files and an amount of data that have been changed or updated is largest, as a timing when virus scanning is to be executed. This allows the user of the multifunction device 10 to know the day of the week when virus scanning is to be executed. The controller 100 may also measure the changed amount of data or the communication amount of data, and make a notification of prompting virus scanning execution, in a case where the changed amount or the communication amount of data has exceeded the changed amount of data or the communication amount of data of the multifunction device 10 in a normal time. For example, in a case where it is set to execute virus scanning once a week (e.g., on Saturdays), the controller 100 detects that there has been a change that invokes a notification, in a case where the changed amount of data or the communication amount of data for a week has exceeded the changed amount of data or the communication amount of data for a week in a normal time. For example, the controller 100 detects that on Monday there has been a change in data (e.g., a usage capacity of the storage 160 has increased due to saving of scanned data or the like) by one week or longer as compared with a normal time, or that the communication amount from a network becomes equal to or more than that for one week or longer in a normal time, or the like. In this case, the controller 100 may make a notification of prompting the user to execute virus scanning on Wednesdays with a message such as "virus scanning should be executed". The virus scanning execution timing is, for example, one day after the day, two days after the day, or the like when it is detected that the changed amount of data or the communication amount of data has exceeded the changed amount of data or the communication amount of data in a normal time. Note that, the changed amount of data or the communication amount of data in a normal time may be set by the user, or may be automatically determined by causing the controller 100 to derive an average value of measurement results for a predetermined period of time, and the like.

(b) In a Case where Usage Status of Multifunction Device 10 Changes

In a case where the number of jobs to be executed increases, the controller 100 determines, as a virus scanning execution timing, the date and time when a notification is made, or a date and time when the use frequency of the multifunction device 10 is lowered next time. This can prompt the user to manually execute virus scanning, or to review the virus scanning schedule by the controller 100. On the other hand, in a case where the number of jobs to be executed decreases, the controller 100 determines, as the virus scanning execution timing, the day of the week or the day when the use frequency of the multifunction device 10 is lowered based on job history information. This enables the controller 100 to prompt the user to review the virus scanning schedule in such a way that the execution frequency of virus scanning is set to one day per week or one day per month. Note that, the above example is one example, and the multifunction device 10 can estimate a usage status pattern from a usage status of the multifunction device 10, determine the timing when virus scanning is to be executed, and notify the user (e.g., an administrator of the multifunction device 10) of the determined timing.

(c) In a Case where Virus Pattern Update Status Changes

In a case where an update status of a virus pattern changes, the controller 100 estimates a timing when a virus pattern is updated next time, determines a date and time when the virus pattern update is completed next time, as the virus scanning execution timing, and notifies the user. The controller 100 also determines whether the virus pattern update has failed, and when the virus pattern update has failed, the controller 100 may notify the user of a handling content. For example, in a case where the virus pattern update has failed, the controller 100 may prompt the user to manually update the virus pattern with a message such as "since the virus pattern update has failed, update the virus pattern manually.". The controller 100 may also notify the user to leave the power of the multifunction device 10 on with a message such as "since the virus pattern update the previous day has failed, update is executed again today. Do not turn off the power.". Note that, in this case, the controller 100 may notify a virus scanning execution timing, when the virus pattern update is completed. For example, a timing immediately after virus pattern update is completed, one day after the day when virus pattern update is completed, or the like is determined as the virus scanning execution timing.

Note that, in a case where the notification condition of a virus scanning execution timing is not satisfied (step S406; No), or in a case where the notification function of a virus scanning execution timing is disabled (step S408; No), the controller 100 omits the pieces of processing of step S410 and step S412.

4.3 Operation Example

Figure 17:
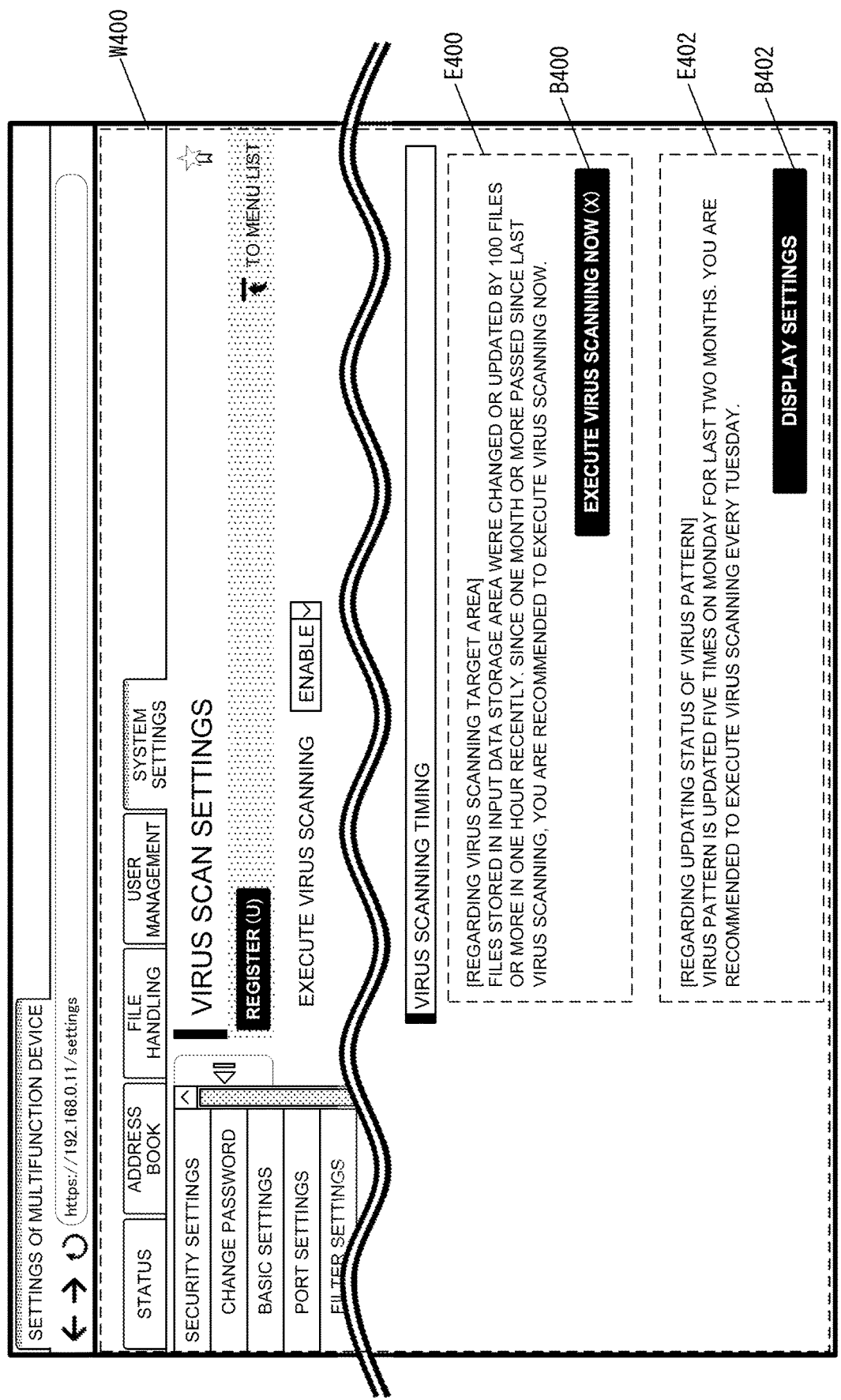
FIG. 17 is a diagram illustrating a screen example of a setting screen according to the fourth embodiment.

FIG. 17 is a diagram illustrating a screen example of a setting screen W400 according to the present embodiment. As illustrated in FIG. 17, the setting screen W400 includes areas (an area E400 and an area E402) where a notification indicating a virus scanning execution timing (timing when virus scanning is to be executed next time) is displayed.

The area E400 is an area where the data update frequency is high, and a notification of prompting to manually execute virus scanning is displayed. The area E400 may include a button B400 for executing virus scanning. The user can recognize that virus scanning execution is necessary based on the information displayed in the area E400, and immediately execute virus scanning by selecting the button B400.

The area E402 is an area where an update status of virus pattern data changes, and a notification indicating that a timing when virus scanning is to be executed next time is displayed. The area E402 may include a button B402 for displaying schedule settings for updating virus pattern data. The user can recognize that the virus scanning schedule needs to be reviewed based on the information displayed in the area E402, and can change the updating schedule for virus pattern data by selecting the button B402.

Note that, FIG. 17 may be displayed on a displayer 140 of the multifunction device 10, or on a displayer 240 of a terminal device 20. The multifunction device 10 may also make a notification by transmitting an e-mail including a notification content to a predetermined e-mail address, as a transmission destination.

Further, the multifunction device 10 may be configured in such a way that a notification (report) is made when virus scanning execution is inhibited by combing the present embodiment with the second embodiment. This allows the user of the multifunction device 10 to know that virus scanning could not be executed on the date and time set as the execution date and time of virus scanning. Likewise, in a case where a virus has been detected by virus scanning, the multifunction device 10 may notify that the virus has been detected, and information of prompting the user to take an appropriate action by using a setting screen or an e-mail.

In this way, the multifunction device according to the present embodiment can notify the user of a timing when virus scanning is to be executed. Since the notification is made via a setting screen (Web operation UI) to be displayed on the terminal device or via an e-mail, the user can check an operating status of the multifunction device by using a Web browser, an e-mail software, and the like, and execute virus scanning during a time period when the use frequency is low, or change the schedule. Further, the user can compare the number of files of the amount of data that have been changed or updated, the operating status, and the like in each of a plurality of multifunction devices by checking a setting screen of each multifunction device, in a case of managing the plurality of multifunction devices, and also systematically investigate and set a virus scanning execution timing.

5. Modification Example

The present disclosure is not limited to the above-described embodiments, and various changes are available. Specifically, embodiments to be acquired by appropriately combining modified technical means within a range that does not depart from the gist of the present disclosure are also included in the technical scope of the present disclosure. Although some of the above-mentioned embodiments are described separately for convenience of explanation, it is of course possible to combine the embodiments within a technically available range. For example, the third embodiment and the fourth embodiment may be combined. In this case, a multifunction device that determines whether to resume or re-execute virus scanning depending on whether virus scanning for a data stored area has not yet been executed, and notifies a virus scanning execution timing is achieved.

In addition, a program operating in each device in the embodiments is a program (a program causing a computer to function) that controls a CPU or the like in such a way as to achieve functions of the above-described embodiments. Further, information to be handled by these devices is temporarily stored in a temporary storage device (e.g., a RAM) at a time of processing, and thereafter, is stored in a storage device such as various read only memories (ROMs), and HDDs, and is read and corrected/written by the CPU as necessary.

Herein, a recording medium for storing the program may be any of a semiconductor medium (e.g., a ROM, a non-volatile memory card, and the like), an optical recording medium/magneto-optical recording medium (e.g., a digital versatile disc (DVD), a magneto optical disc (MO), a mini disc (MD), a compact disc (CD), a Blu-ray (registered trademark) disc (BD), and the like), a magnetic recording medium (e.g., a magnetic tape, a flexible disk, and the like), and the like. In addition, not only functions of the above-described embodiments are achieved by executing a loaded program, but also functions of the present disclosure may be achieved by processing the program jointly with an operating system, other application program, or the like, based on an instruction of the program.

Further, in a case of distributing the program in the market, the program can be stored in a portable recording medium and distributed, or can be transferred to a server computer connected via a network such as the Internet. In this case, it is needless to say that a storage device of the server computer is also included in the present disclosure.

What is claimed is:

1. An image forming apparatus comprising:
    a displayer; a controller; a storage; and an image former that forms an image according to a set content,
    wherein the storage secures an area for storing an input image, and
    the controller:
        displays, in the displayer, a setting screen on which settings of a system are executed,
        executes settings of an image forming apparatus based on a content set on the setting screen, wherein the setting screen includes settings pertaining to a virus quarantine timing,
        executes virus quarantine processing for the area in the storage based on the settings pertaining to the virus quarantine timing,
        stop the virus quarantine processing for the area if an input image is stored in the area while the virus quarantine processing is being executed, and
        re-executes the virus quarantine processing for the area after a job using the input image stored in the area is completed.

2. The image forming apparatus according to claim 1, wherein
    the controller re-executes the virus quarantine processing for the area in the storage on a date and time when a use frequency of the image forming apparatus is lowered.

3. The image forming apparatus according to claim 2, wherein the controller:
determines a time when the use frequency of the image forming apparatus is lowered by using job history information,
determines a date and time corresponding to the determined time, and corresponding to an earliest time after the virus quarantine processing for the area in the storage is stopped, and
sets the date and time corresponding to the determined time as the date and time when the virus quarantine processing for the area in the storage is re-executed.

4. The image forming apparatus according to claim 1, wherein
the setting screen further includes a date and time when the virus quarantine processing for the area in the storage is re-executed.

5. The image forming apparatus according to claim 1, wherein
the setting screen further includes an instructor that instructs the execution of the virus quarantine processing, and
the controller executes the virus quarantine processing in a case that the execution of the virus quarantine processing is instructed via the instructor.

6. The image forming apparatus according to claim 1, wherein
when a frequency of operations for the area has reached a predetermined frequency, a notification of prompting the execution of the virus quarantine processing is made.

7. The image forming apparatus according to claim 6, wherein
the notification includes information indicating a timing when the virus quarantine processing is to be executed.

8. A control method for an apparatus that forms an image according to settings, and that has a storage securing an area for storing an input image, the control method comprising:
displaying a setting screen on which settings of a system are executed;
executing settings of an image forming apparatus based on a content set on the setting screen, wherein the setting screen includes settings pertaining to a virus quarantine timing;
executing virus quarantine processing for the area in the storage based on the settings pertaining to the virus quarantine timing;
stopping the virus quarantine processing for the area if an input image is stored in the area while the virus quarantine processing is being executed; and
re-executing the virus quarantine processing for the area after a job using the input image stored in the area is completed.

9. A system comprising:
a displayer; a first controller; a first communicator that communicates with an image forming apparatus; and
a second controller; a storage; an image former that forms an image according to a set content; and a second communicator, wherein
the storage secures an area for storing an input image,
the first controller:
receives information pertaining to a setting screen that executes settings for a system of the image forming apparatus via the first communicator,
displays the setting screen in the displayer,
executes settings for the image forming apparatus based on the set content in the setting screen, and
transmits the settings of the image forming apparatus to the image forming apparatus via the first communicator, wherein the setting screen includes settings pertaining to a virus quarantine timing, and
the second controller:
receives the settings of the image forming apparatus via the second communicator,
executes virus quarantine processing for the area in the storage based on the settings pertaining to the virus quarantine timing,
stop the virus quarantine processing for the area if an input image is stored in the area while the virus quarantine processing is being executed, and
re-executes the virus quarantine processing for the area after a job using the input image stored in the area is completed.

* * * * *